US011378751B2

(12) United States Patent
Patel et al.

(10) Patent No.: US 11,378,751 B2
(45) Date of Patent: Jul. 5, 2022

(54) LASER PATTERNED ADAPTERS WITH WAVEGUIDES AND ETCHED CONNECTORS FOR LOW COST ALIGNMENT OF OPTICS TO CHIPS

(71) Applicant: Cisco Technology, Inc., San Jose, CA (US)

(72) Inventors: Vipulkumar Patel, Breinigsville, PA (US); Matthew J. Traverso, Santa Clara, CA (US); Ashley J. Maker, Pleasanton, CA (US); Jock T. Bovington, La Mesa, CA (US)

(73) Assignee: Cisco Technology, Inc., San Jose, CA (US)

( * ) Notice: Subject to any disclaimer, the term of this patent is extended or adjusted under 35 U.S.C. 154(b) by 37 days.

(21) Appl. No.: 16/923,852

(22) Filed: Jul. 8, 2020

(65) Prior Publication Data

US 2020/0393622 A1    Dec. 17, 2020

Related U.S. Application Data

(62) Division of application No. 16/058,608, filed on Aug. 8, 2018, now Pat. No. 10,746,934.

(51) Int. Cl.
*G02B 6/30* (2006.01)
*G02B 6/26* (2006.01)
*G02B 6/42* (2006.01)

(52) U.S. Cl.
CPC ..................... *G02B 6/30* (2013.01)

(58) Field of Classification Search
CPC .......... G02B 6/30; G02B 6/136; G02B 6/255; G02B 6/2555; G02B 6/2556; G02B 7/003; G02B 3/0075

(Continued)

(56) References Cited

U.S. PATENT DOCUMENTS 9,933,574 B1 *  4/2018  Zhang .................. G02B 6/4214
9,995,881 B1     6/2018  Patel et al.
(Continued)

FOREIGN PATENT DOCUMENTS

WO    2017009468 A1    1/2017
WO    2018022318 A1    2/2018

OTHER PUBLICATIONS

U.S. Appl. No. 15/946,930 entitled "Fiber Coupler With an Optical Window," filed Apr. 6, 2018.

(Continued)

*Primary Examiner* — Kaveh C Kianni
*Assistant Examiner* — Hung Q Lam
(74) *Attorney, Agent, or Firm* — Patterson + Sheridan, LLP

(57) ABSTRACT

By determining an alignment point for a photonic element in a substrate of a given material; applying, via a laser aligned with the photonic element according to the alignment point, an etching pattern to the photonic element to produce a patterned region and an un-patterned region in the photonic element, wherein applying the etching pattern alters a chemical bond in the given material for the patterned region of the photonic element that increases a reactivity of the given material to an etchant relative to a reactivity of the un-patterned region, and wherein the patterned region defines an engagement feature in the un-patterned region that is configured to engage with a mating feature on a Photonic Integrated Circuit (PIC); and removing the patterned region from the photonic element via the etchant, various systems and methods may make use of laser patterning in optical components to enable alignment of optics to chips.

20 Claims, 20 Drawing Sheets

(58) Field of Classification Search
USPC .............. 385/14, 15, 49, 50, 52, 129–132
See application file for complete search history.

(56) References Cited

U.S. PATENT DOCUMENTS

| | | |
|---|---|---|
| 2013/0209112 A1 | 8/2013 | Witzens |
| 2015/0268419 A1 | 9/2015 | Van Steenberge et al. |
| 2017/0160490 A1 | 6/2017 | Zhang et al. |

OTHER PUBLICATIONS

Lars Brusberg, Alan Evans, Davide Fortusini, "Lars Brusberg, Alan Evans, Davide Fortusini," 5th Symposium for Optical Interconnect in Data Centres, Sep. 19, 2017, Gothenburg, Sweden, 19 pages.

Choudhury et al. "Ultrafast laser inscription: perspectives on future integrated applications," Laser Photonics Rev. 8, No. 6, 827-846 (2014).

Paul Mitchell, John Macdonald, Graeme Brown, and Nicholas Psaila,"90° Optical Hybrid Front-End Circuit Fabricated by 3D Direct Laser Inscription," OSA Technical Digest (online) (Optical Society of America, 2017), paper W1B.5 [Abstract Only].

PCT Notification of Receipt of Search Copy for Application No. PCT/US2019/045176 dated Oct. 9, 2019.

PCT International Search Report for Application No. PCT/US2019/045176 dated Oct. 25, 2019.

PCT International Preliminary Report on Patentability for Application No. PCT/US2019/045176 dated Feb. 9, 2021.

\* cited by examiner

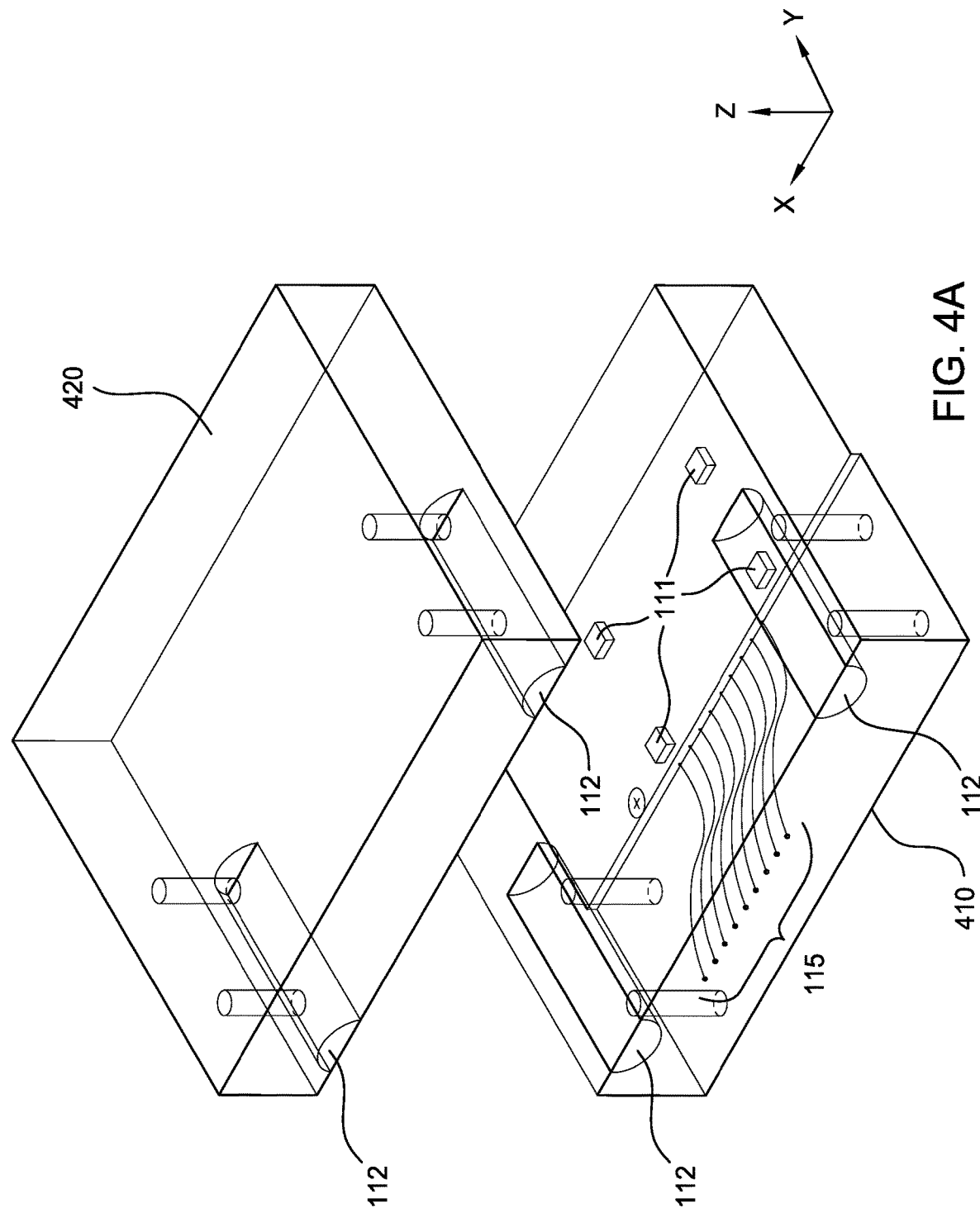

LASER PATTERNED ADAPTERS WITH WAVEGUIDES AND ETCHED CONNECTORS FOR LOW COST ALIGNMENT OF OPTICS TO CHIPS

CROSS-REFERENCE TO RELATED APPLICATIONS

This application is a divisional of U.S. application Ser. No. 16/058,608 entitled LASER PATTERNED ADAPTERS WITH WAVEGUIDES AND ETCHED CONNECTORS FOR LOW COST ALIGNMENT OF OPTICS TO CHIPS filed Aug. 8, 2018, which is hereby incorporated by reference in its entirety.

TECHNICAL FIELD

Embodiments presented in this disclosure generally relate to fabricating features in optoelectronic devices. More specifically, embodiments disclosed herein provide for the use of lasers to improve the etching of physical features in addition to optical features in photonic elements.

BACKGROUND

The discrete optical and electronic components of optoelectronic devices are fabricated separately and later joined together to produce an assembled device. Various epoxies and engagement features may be used to ensure that the optical and electronic components maintain proper joints once assembled, but due to the tolerances of these devices, the relative locations of the features present in the optical and electronic components is typically verified before finalizing assembly (e.g. curing the epoxy).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-D illustrate various views of the photonic elements of an optical adapter constructed as a multi-piece unit according to aspects of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
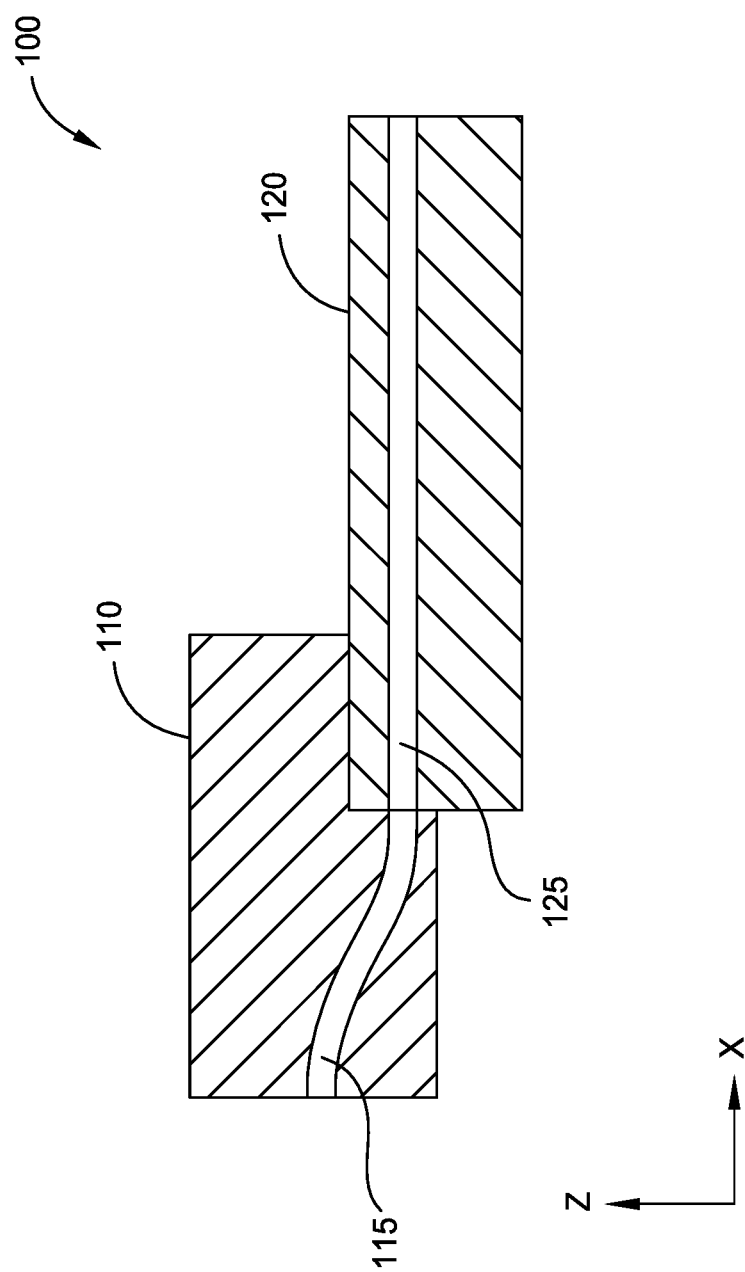
FIG. 1 illustrates an example optoelectronic device according to aspects of the present disclosure.

One embodiment presented in this disclosure provides a substrate fabricated with laser patterned adapters with waveguides and etched connectors for low cost alignment of optics to chips, the substrate comprising: a light-transmissive material having a first side and a second side opposite to the first side; a plurality of dies defined in the light-transmissive material, each die of the plurality of dies including: a first pattern imparted on the light-transmissive material by a laser, wherein the first pattern extends into the light-transmissive material from the first side, the first pattern defining a patterned region of the light-transmissive material and an un-patterned region of the light-transmissive material, wherein a chemical structure of the patterned region has an increased reactivity to an etchant relative to the un-patterned region, and wherein the patterned region defines an engagement feature in the un-patterned region that is configured to engage with a mating feature on a Photonic Integrated Circuit (PIC); and a second pattern imparted on the light-transmissive material by the laser, wherein the second pattern extends to neither the first side nor the second side, the second pattern defining a permanent waveguide within the light-transmissive material resulting from a laser induced change in the material/crystal structure, wherein the waveguide is aligned relative to the engagement feature to optically couple with an integrated waveguide of the PIC.

Another embodiment presented in this disclosure provides a method for fabricating laser patterned adapters with waveguides and etched connectors for low cost alignment of optics to chips, the method comprising: determining an alignment point for a photonic element in a substrate of a given material; applying, via a laser aligned with the photonic element according to the alignment point, an etching pattern to the photonic element to produce a patterned region and an un-patterned region in the photonic element, wherein applying the etching pattern alters a chemical bond in the given material for the patterned region of the photonic element that increases a reactivity of the given material to an etchant relative to a reactivity of the un-patterned region, and wherein the patterned region defines an engagement feature in the un-patterned region that is configured to engage with a mating feature on a Photonic Integrated Circuit (PIC); and removing the patterned region from the photonic element via the etchant.

A further embodiment presented in this disclosure provide a method for fabricating laser patterned adapters with waveguides and etched connectors for low cost alignment of optics to chips, the method comprising: imparting a first pattern on a light-transmissive material by a laser, wherein the first pattern extends into the light-transmissive material from a first side to a second side that is opposite to the first side, wherein the first pattern defines an un-patterned region of the light-transmissive material and a patterned region of the light-transmissive material that has an increased reactivity to an etchant relative to the un-patterned region, and wherein the patterned region defines an engagement feature in the un-patterned region that is configured to engage with a mating feature on a Photonic Integrated Circuit (PIC); and imparting a second pattern on the light-transmissive material by the laser, wherein second pattern extends to neither the first side nor the second side, the second pattern defining a waveguide within the light-transmissive material aligned relative to the engagement feature to optically couple with an integrated waveguide of the PIC.

EXAMPLE EMBODIMENTS

The present disclosure provides systems and methods for the use of laser patterning in optical components to affect the etch rate of the optical components and the optical components produced according to such systems and methods. By applying laser light to an optical component, not only can the laser construct waveguides within the material matrix of the optical component, but the laser may also change the material's susceptibility to chemical etching. The laser precisely imparts a three-dimensional pattern into the material to control what portions of the material have higher etching rates than the surrounding un-patterned material, and may also impart three dimensional patterns that affect the refractive indices of the material to form waveguides. Once the etchant is applied, the patterned regions are removed at a faster rate than the un-patterned regions, and the optical component exhibits physical features that are co-aligned with the optical features (e.g., waveguides). By co-aligning the optical and physical components and employing the high degree of precision of laser patterning, the optical components avoid the need for active alignment and testing before integration into an optoelectronic assembly, thus improving yields, improving speed of assembly, and reducing overlapping/stacking tolerances by providing more precisely toleranced components. Laser patterning and chemical etching provides a higher degree of precision in tolerancing the defined components than physical etching (e.g., ± hundreds of nanometers versus ±tens of micrometers (also referred to as microns)), and allow for components to be co-fabricated with fewer and less labor-intensive verification tests.

The laser used in laser patterning shines a high intensity light into the material of the optical component (e.g., a $SiO_2$ based material) to break chemical bonds within the material to alter the light-transmission properties of the material and/or affect how readily the material reacts with an etchant. The etchant may include various acids (e.g., HCl, $HNO_3$, $H_2SO_4$) or other caustic compounds that bond with the patterned material more readily than the un-patterned material and that may be washed away to remove material from the optical component. In some embodiments, laser patterning increases the reactivity of the material up to around 5000 times the reactivity of the un-patterned material.

When patterning an optical component, the laser maintains a reference point (e.g., an edge of the optical component of a substrate containing several optical components) so that the beam precisely defines the portions of the material that are to become waveguides, and what portions are to be removed during chemical etching. In some embodiments, establishing the waveguides using laser patterning is performed simultaneously with defining the portions of material to remove. In additional embodiments, laser patterning is done prior to and the chemical etching is done after physical etching to allow a rough physical removal of material followed by a more precise chemical removal of material, or to establish flow guides for the etchant prior to chemical etching.

FIG. 1 illustrates an example optoelectronic device 100 that includes an optical adapter 110 and a Photonic Integrated Circuit (PIC) 120 in an example arrangement. Each of the optical adapter 110 and the PIC 120 are examples of optical elements that may be laser patterned according to embodiments of the present disclosure. The optical adapter 110 and the PIC 120 are each made of a glass material (such as $SiO_2$, which may be doped with various dopants) or other light-transmissive material to which a laser may be applied to selectively break or alter the chemical bonds of that material to affect the reactivity of that material to a chemical etchant; affecting the material or crystal structure of the substrate (i.e., the chemical structure). Various waveguides 115 in the Optical Adapter 110 and integrated waveguides 125 in the PIC 120 are defined in the respective materials to establish distinct pathways over which beams of light may be propagated. In some embodiments, a photo-receiver (e.g., a light-activated diode) connected to a waveguide 115 receives a beam of light propagated from an external source, and in other embodiments a light source (e.g., a fiber optic cable or laser) connected to a waveguide 115 transmits a beam of light through the material.

The optical adapter 110 is a passive device that connects the optoelectronic device 100 to various other devices or cabling. For example, the optical adapter 110 may be a Fiber Array Unit (FAU) to connect the optoelectronic device 100 with various fiber optic cabling via several individual light paths arranged in an array. In various embodiments, the optical adapter 110 conforms to various standard shapes and sizes for optical connectors, including, but not limited to: Media Interface Connector (MIC), Aviation Intermediate Maintenance (Avio), Diamond Micro Interface (DIM), IEC 61754 (and variants/offshoots thereof, such as Multiple-Fiber Push-On/Pull-Off), Enterprise Systems Connection (ESCON), and the like. As such, the number of waveguides 115, the spacing and arrangement of waveguides 115, and various connection points on the optical adapter 110 may vary based on the standard and how the PIC 120 is arranged.

The PIC 120 is a photonic element that may operate to amplify, dim, extinguish, phase shift, switch, modulate, direct optical signals, and convert optical signals to an electrical signal for use by an Electrical Integrated Circuit (EIC) integrated with or connected to the PIC 120. The EIC is an electrical circuit that operates with the PIC 120 to send or receive and process optical signals. The EIC may include a processor, memory storage devices, communications interfaces to other electrical circuits or equipment, and components to drive or receive optical signals via the PIC 120. The optical adapter 110 optically interfaces with the PIC 120 to carry optical signals from the PIC 120 to external devices or to the PIC 120 from external devices. The optical adapter 110 may physically interface with one or more of the EIC and the PIC 120 via various connectors and/or epoxies.

FIGS. 2A-D illustrate various views of an example optoelectronic device 100 with an optical adapter 110 configured to optically couple with a PIC 120 for direct transmission. As will be appreciated, in a given view, a given feature may be occluded or obscured by another feature, and a better understanding of how the features of an optoelectronic device interact may be gained by considering FIGS. 2A-D in aggregate than individually.

Figure 2A:
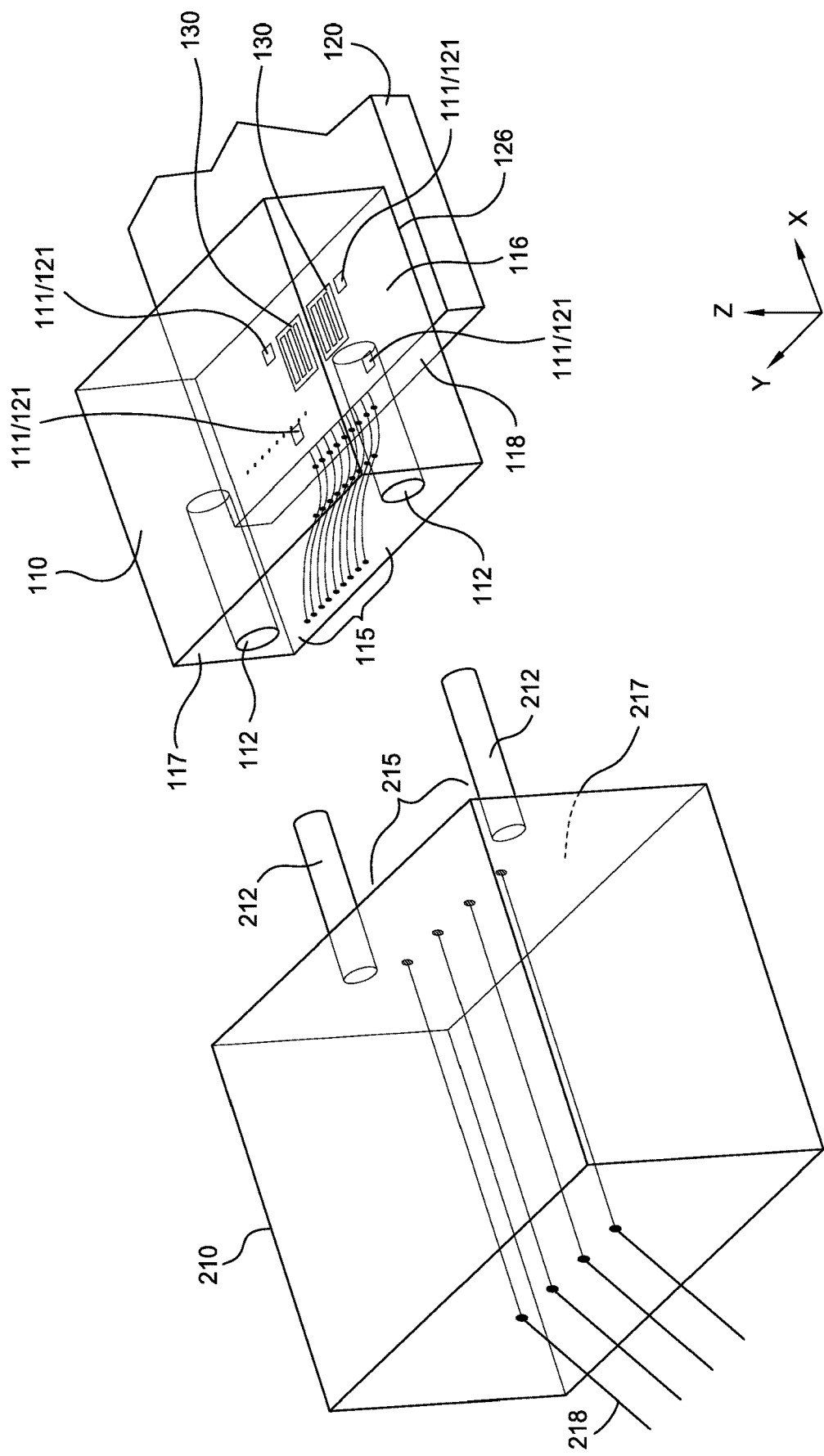
FIGS. 2A-D illustrate various views of an example optoelectronic device with an optical adapter configured to optically couple for linear transmission according to aspects of the present disclosure.

FIG. 2A illustrates an isometric view of a translucent optical adapter 110 that is affixed to and optically coupled with the PIC 120. As shown, engagement features 111 of the optical adapter 110 are engaged with mating features 121 of the PIC 120, and epoxy joints 130 are formed between the optical adapter 110 and the PIC 120. Epoxy joints 130 are formed via a deposited epoxy (e.g., in an epoxy well) being cured to bond one component to another. The optical adapter 110 shows cable connectors 112 extending from a free surface 117, and a set of waveguides 115 that run from the free surface 117 of the optical adapter 110 to an optical coupling interface 118 of the optical adapter 110 that is held in contact with integrated waveguides 125 in the PIC 120. A mating interface 116 and an optical coupling interface 118 of the optical adapter 110 may be collectively referred to as a connecting surface, and although illustrated as being disposed on two orthogonal planes in FIGS. 2A-D, may be disposed on a curved surface or more than two planes in other embodiments.

An external fiber optic plug 210 is illustrated in relation to the optoelectronic device 100, which may be coupled with the optoelectronic device 100 via the optical adapter 110. As illustrated, the external fiber optic plug 210 includes securing features 212 that secure the external fiber optic plug 210 to the optical adapter 110, and fiber waveguides 215 that extend from a plug surface 217 to fiber cables 218. In the illustrated example, the securing features 212 are male prongs that the cable connectors 112 are configured to receive to secure the plug surface 217 of the external fiber optic plug 210 against the free surface 117 of the optical adapter 110. In other embodiments, in which the securing features 212 are female connectors, the cable connectors 112 are male connectors configured for insertion into the securing features 212 to secure the plug surface 217 against the free surface 117. When secured against the free surface 117, a fiber waveguide 215 is optically coupled with a waveguide 115 in the optical adapter 110. In various embodiments, some or all of the fiber waveguides 215 may optically couple with some or all of the waveguides 115. For example, an external fiber optic plug 200 may include N fiber waveguides 215 and the optical adapter 110 may include N waveguides 115 to allow each fiber waveguide 215 to optically couple with one waveguide 115. In another example, an external fiber optic plug 200 may include N fiber waveguides 215 and the optical adapter 110 may include N+M waveguides 115 (e.g., to work with multiple standards of external fiber optic plug 200), and M of the waveguides 115 may remain uncoupled when N of the waveguides 115 are optically coupled with the N fiber waveguides 215.

Figure 2B:
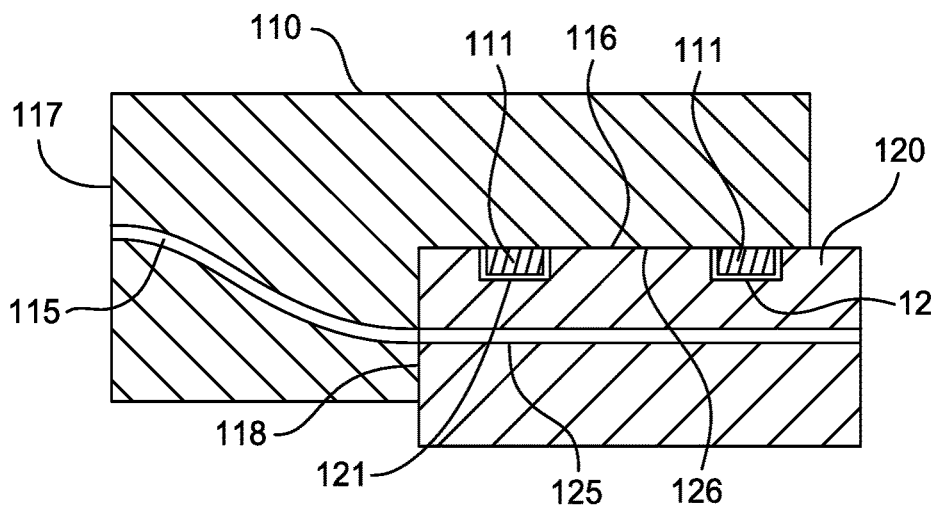

FIG. 2B illustrates a cross-section of the example optoelectronic device 100, showing details of the installed optical adapter 110 and PIC 120. Although FIG. 2B shows one planar view with various features, other planar views may show more or fewer features, such as the cable connectors 112 (not shown in FIG. 2B) that extend through various other planes. The waveguide 115 is fabricated within the optical adapter 110 and is optically exposed on a free surface 117 of the optical adapter 110 and mated at the optical coupling interface 118 of the optical adapter 110 with the integrated waveguide 125 of the PIC 120. As used herein, optical exposure does not require physical exposure; a waveguide 115, 125 may be encased in a substrate and receive and transmit light through that substrate. Accordingly, a waveguide 115, 125 may be optically exposed when a given end of the waveguide 115, 125 is within a predefined distance (e.g., about 5 micrometers) of a given surface of the optical adapter 110 or PIC 120 so as to be able to transmit or receive light from one side of the given surface to the other side. Various lenses and filters (not illustrated) may be used in some embodiments at one or more of a first end or a second end of a waveguide 115 to aid in gathering or transmitting light to a fiber waveguide 215 or an integrated waveguide 125.

Figure 2C:
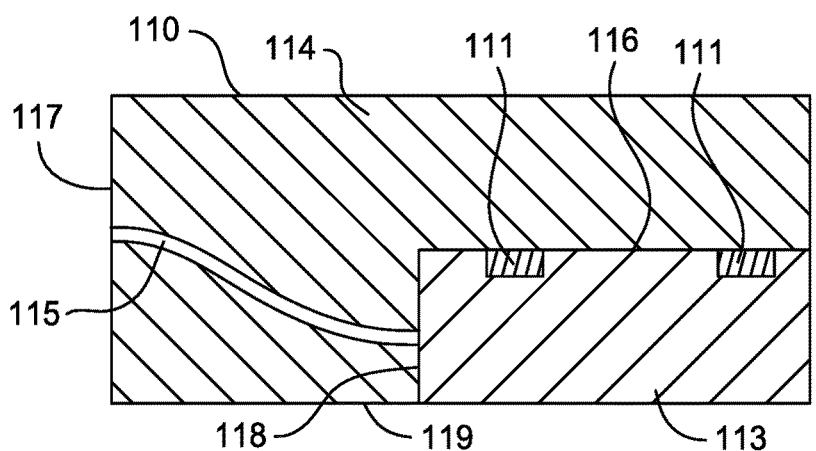
Figure 2D:
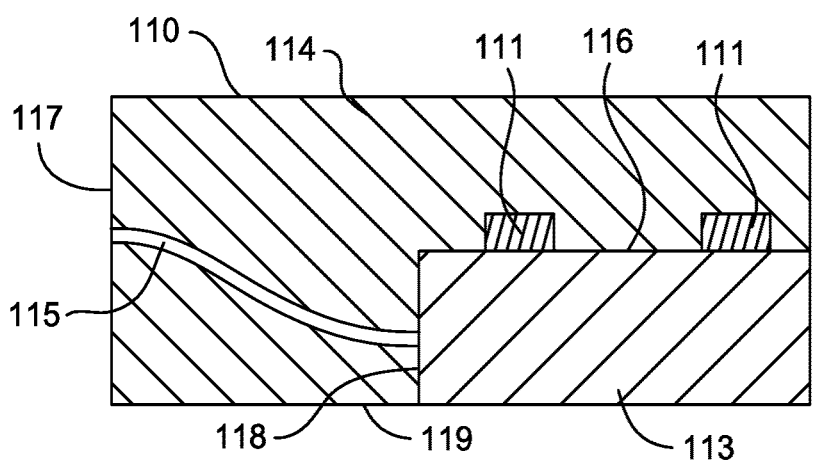

FIG. 2C illustrates a cross-section of a substrate, such as a glass or optical resin, from which the optical adapter 110 may be fabricated that defines male connector engagement features 111. FIG. 2D illustrates an alternative cross-section of a substrate from which the optical adapter 110 may be fabricated that defines female connector engagement features 111. In either embodiment, a laser is used to impart an etching pattern in the material of the substrate to define a patterned region 113 and an un-patterned region 114. The patterned region 113 has a higher reactivity to a chemical etchant than the un-patterned region 114, and the borders between the regions define various faces and features of the optical adapter 110. The laser may also (simultaneously or at a different time) impart a waveguide pattern to define one or more waveguides 115 in the material of the substrate. The waveguide pattern imparts a different refractive index to portions of the material to guide light from one surface to another. In various embodiments, the waveguides 115 may be optically exposed in the material of the substrate via physical etching, polishing, or chemical etching.

The laser forms the patterned region 113 by imparting energy to the material of the substrate, thereby affecting chemical bonds in the material and increasing the reactivity of the material in the patterned region 113 (relative to the reactivity of the material in the un-patterned region 114) to an etchant. The etchant is then applied to an etching surface 119 of the substrate to remove the patterned region 113 and leave behind the un-patterned region 114. Because the borders between the patterned region 113 and the un-patterned region 114 define the various contacting surfaces (e.g., a mating interface 116, an optical coupling interface 118), engagement features 111, and cable connectors 112 in the optical adapter 110, once the patterned region 113 is removed, the optical adapter 110 includes the engagement features 111 and the cable connectors 112. The patterned region 113 may define the various engagement features 111 and cable connectors 112 as male connectors (e.g., extending outward from a face of the optical adapter 110) or as female connectors (e.g., extending inward from a face of the optical adapter 110).

The engagement features 111 are defined on the mating interface 116 in relation to the waveguides 115 of the optical adapter 110 so that when the optical adapter 110 is affixed to the PIC 120, the waveguides 115 are aligned to optically couple with the integrated waveguides 125 of the PIC 120. Similarly, the cable connectors 112 are defined in the free surface 117 of the optical adapter 110 in relation to where the waveguides 115 are located on the free surface 117. In some embodiments, the relative locations of the cable connectors 112 and the waveguides 115 are set according to various standards used for the cabling intended for connection to the optoelectronic device 100 (e.g., the fiber optic plug 210).

FIGS. 3A-D illustrate various views of an example optoelectronic device 100 with an optical adapter 110 configured to optically couple with a PIC 120 for evanescent transmission. As will be appreciated, in a given view, a given feature may be occluded or obscured by another feature, and a better understanding of how the features of an optoelectronic device interact may be gained by considering FIGS. 3A-D in aggregate than individually.

Figure 3A:
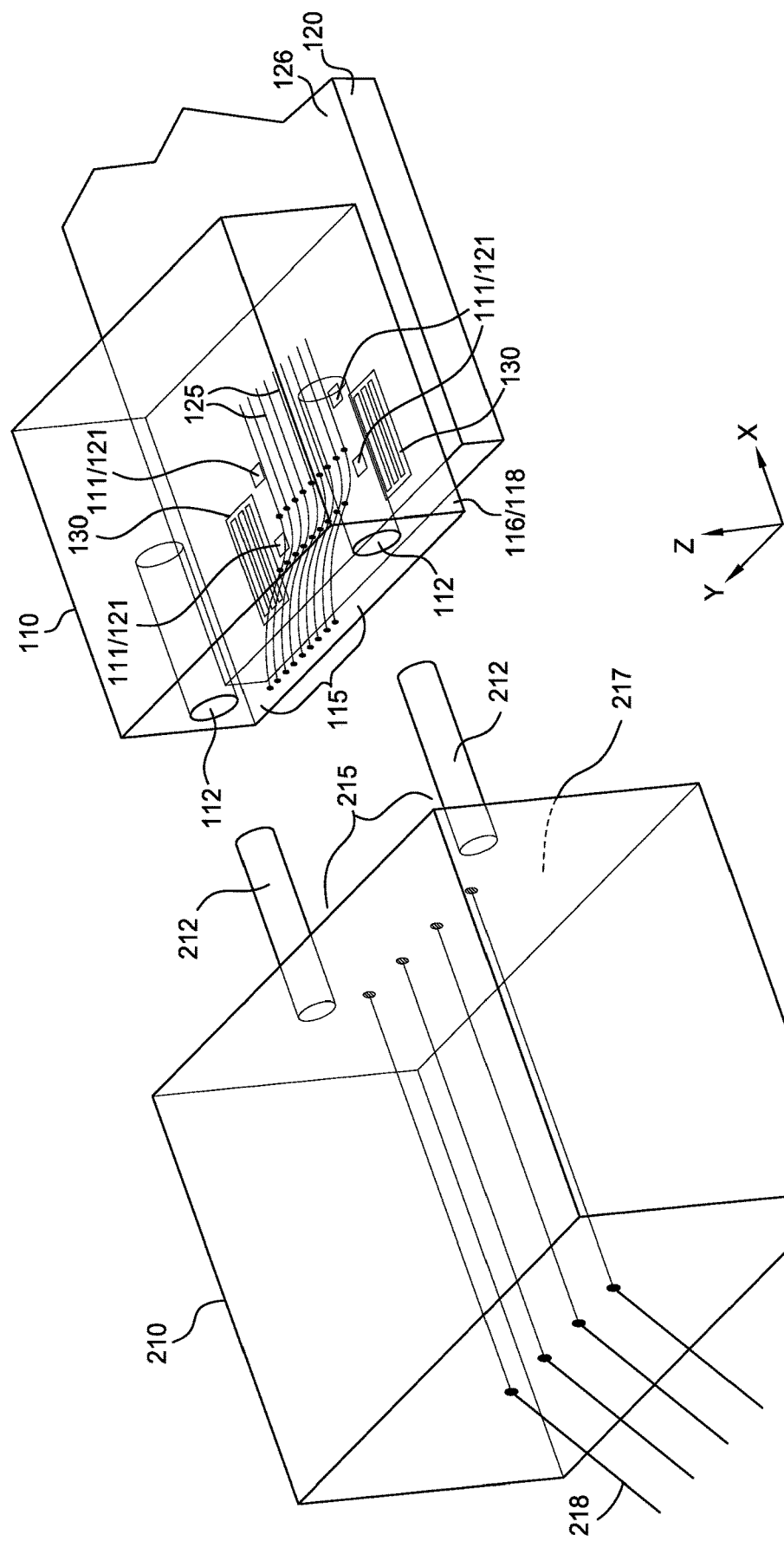
FIGS. 3A-D illustrate various views of an example optoelectronic device with an optical adapter configured to optically couple for evanescent transmission according to aspects of the present disclosure.

FIG. 3A illustrates an isometric view of a translucent optical adapter 110 that is affixed to and optically coupled with the PIC 120. As shown, engagement features 111 of the optical adapter 110 are engaged with mating features 121 of the PIC 120, and epoxy joints 130 are formed between the optical adapter 110 and the PIC 120. Epoxy joints 130 are formed via a deposited epoxy (e.g., in an epoxy well) being cured to bond one component to another. The optical adapter 110 shows cable connectors 112 extending inward from a free surface 117, and a set of waveguides 115 that run from the free surface 117 of the optical adapter 110 to an optical coupling interface 118 of the optical adapter 110 that is held in contact with integrated waveguides 125 in the PIC 120 that extend to the mating surface 126 of the PIC 120. A mating interface 116 and an optical coupling interface 118 of the optical adapter 110 may be collectively referred to as a connecting surface. In some embodiments that use evanescent transmission, the mating interface 116 and the optical coupling interface 118 of the optical adapter 110 may be coplanar, but in other embodiments may be located on separate parallel planes.

An external fiber optic plug 210 is illustrated in relation to the optoelectronic device 100, which may be coupled with the optoelectronic device 100 via the optical adapter 110. As illustrated, the external fiber optic plug 210 includes securing features 212 that secure the external fiber optic plug 210 to the optical adapter 110, and fiber waveguides 215 that extend from a plug surface 217 to fiber cables 218. In the illustrated example, the securing features 212 are male prongs that the cable connectors 112 are configured to receive to secure the plug surface 217 of the external fiber optic plug 210 against the free surface 117 of the optical adapter 110. In other embodiments, in which the securing features 212 are female connectors, the cable connectors 112 are male connectors configured for insertion into the securing features 212 to secure the plug surface 217 against the free surface 117. When secured against the free surface 117, a fiber waveguide 215 is optically coupled with a waveguide 115 in the optical adapter 110. In various embodiments, some or all of the fiber waveguides 215 may optically couple with some or all of the waveguides 115. For example, an external fiber optic plug 200 may include N fiber waveguides 215 and the optical adapter 110 may include N waveguides 115 to allow each fiber waveguide 215 to optically couple with one waveguide 115. In another example, an external fiber optic plug 200 may include N fiber waveguides 215 and the optical adapter 110 may include N+M waveguides 115 (e.g., to work with multiple standards of external fiber optic plug 200), and M of the waveguides 115 may remain uncoupled when N of the waveguides 115 are optically coupled with the N fiber waveguides 215.

Figure 3B:
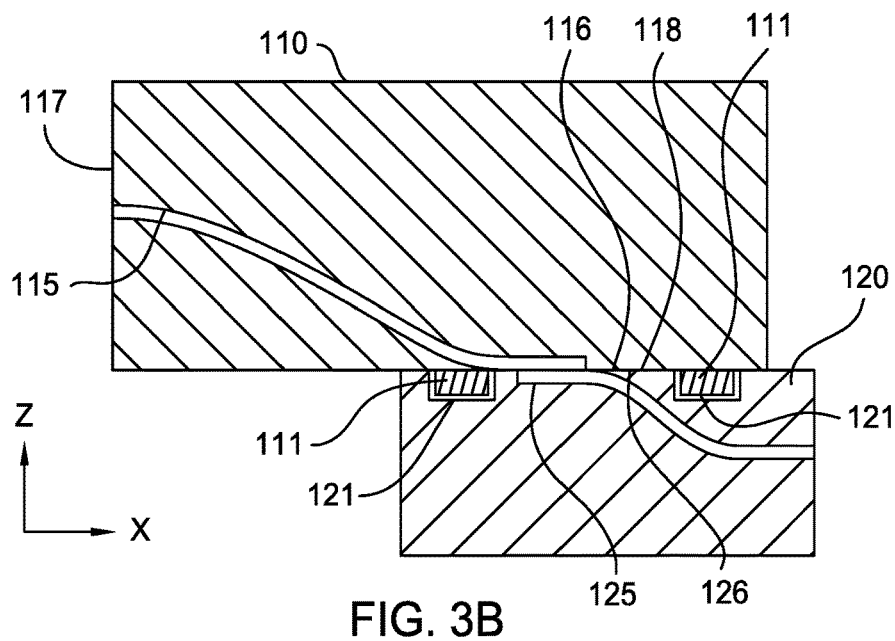

FIG. 3B illustrates a cross-section of the example optoelectronic device 100, showing details of the installed optical adapter 110 and PIC 120. Although FIG. 3B shows one planar view with various features, other planar views may show more or fewer features, such as cable connectors 112 (not shown in FIG. 3B) that extend through various other planes. The waveguide 115 is fabricated within the optical adapter 110 and is optically exposed on a free surface 117 of the optical adapter 110 and mated at the optical coupling interface 118 of the optical adapter 110 with the integrated waveguide 125 of the PIC 120.

Figure 3C:
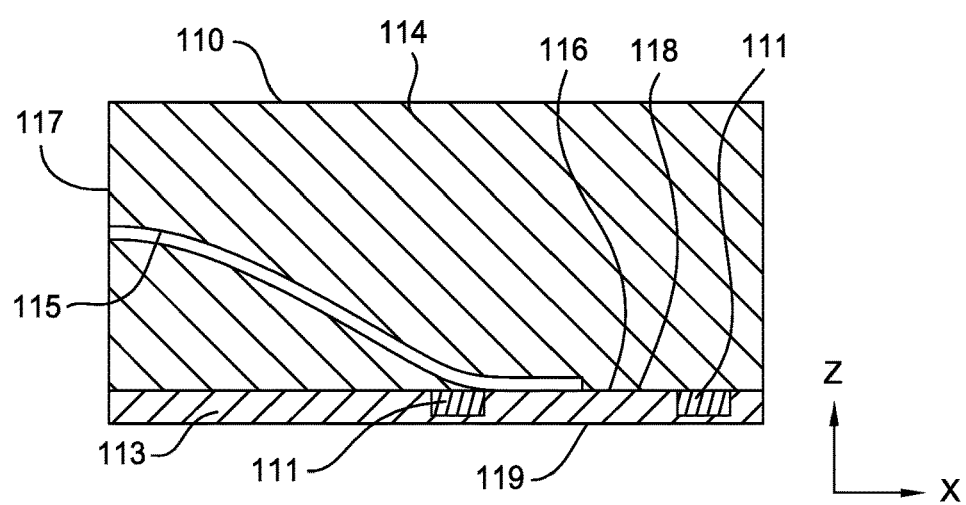

FIG. 3C illustrates a cross-section of a substrate, such as a glass or optical resin, from which the optical adapter 110 may be fabricated that defines male connector engagement features 111. A laser is used to impart an etching pattern in the material of the substrate to define a patterned region 113 and an un-patterned region 114. The patterned region 113 has a higher reactivity to a chemical etchant than the un-patterned region 114, and the borders between the regions define various faces and features of the optical adapter 110. The etching pattern is applied to an etching surface 119 of the substrate, to which the chemical etchant is applied to remove the patterned region 113 during a chemical etch process. The laser may also (simultaneously or at a different time) impart a waveguide pattern to define one or more waveguides 115 in the material of the substrate in the un-patterned region 114. The waveguide pattern imparts a different refractive index to portions of the material to guide light from one surface to another. In various embodiments, the waveguides 115 may be optically exposed in the material of the substrate via physical etching, polishing, or chemical etching.

Figure 3D:
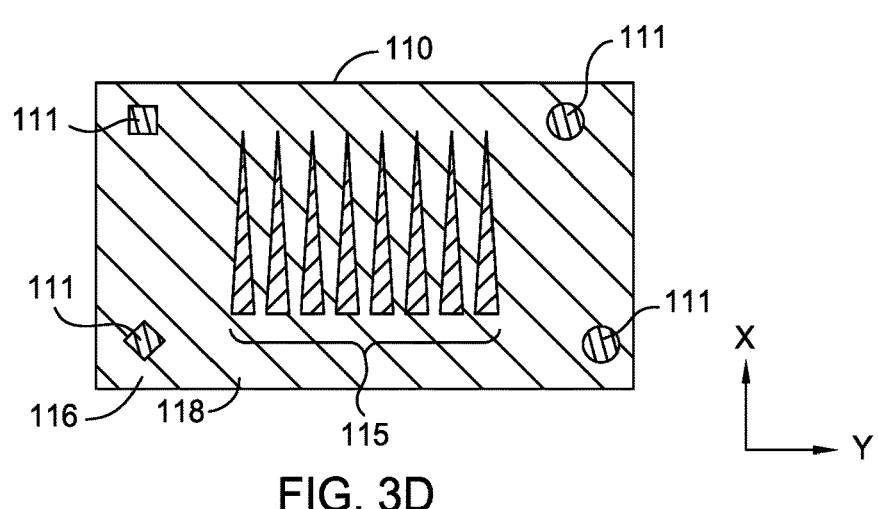

FIG. 3D illustrates an underside of an optical adapter 110 configured for evanescent transmission that shows various features present on the mating interface 116 of the optical adapter 110. Four engagement features 111 with various shapes and orientations on the mating interface 116 are present, and are oriented for engagement with mating features 121 on the PIC 120. Although the example engagement features 111 are shown as having quadrilateral and circular cross sections, other shapes and sizes of engagement features 111 are possible. Similarly, more or fewer than four engagement features 111 may be present on the mating interface 116, and the engagements features 111 may be male connectors, female connectors, or a combination of male and female connectors. The shapes, sizes, and positions of the engagements features 111 on the mating interface 116 relative to one another may be such that the optical adapter 110 has only one orientation that matches with the mating features 121 of the PIC 120.

The engagement features 111 are defined on the mating interface 116 in relation to the waveguides 115 of the optical adapter 110 so that when the optical adapter 110 is affixed to the PIC 120, the waveguides 115 are aligned to optically couple with the integrated waveguides 125 of the PIC 120. Similarly, the cable connectors 112 are defined in the free surface 117 of the optical adapter 110 in relation to where the waveguides 115 are located on the free surface 117. In some embodiments, the relative locations of the cable connectors 112 and the waveguides 115 are set according to various standards used for cabling intended for connection to the optoelectronic device 100 (e.g., a fiber optic plug 210).

FIGS. 4A-D illustrate various views of the photonic elements of an optical adapter 110 constructed as a multi-piece unit. As will be appreciated, in a given view, a given feature may be occluded or obscured by another feature, and a better understanding of how the features of an optoelectronic device interact may be gained by considering FIGS. 4A-D in aggregate than individually.

FIG. 4A is an isometric view of a first photonic element 410 and a second photonic element 420 that are configured to connect together to form an optical adapter 110. The illustrated first photonic element 410 includes the engagement features 111, a first portion of the cable connectors 112, and the waveguides 115. The illustrated second photonic element 420 includes a second portion of the cable connectors 112, so that when the first photonic element 410 is connected with the second photonic element 420, the first and second portions define the cable connectors 112.

Figure 4B:
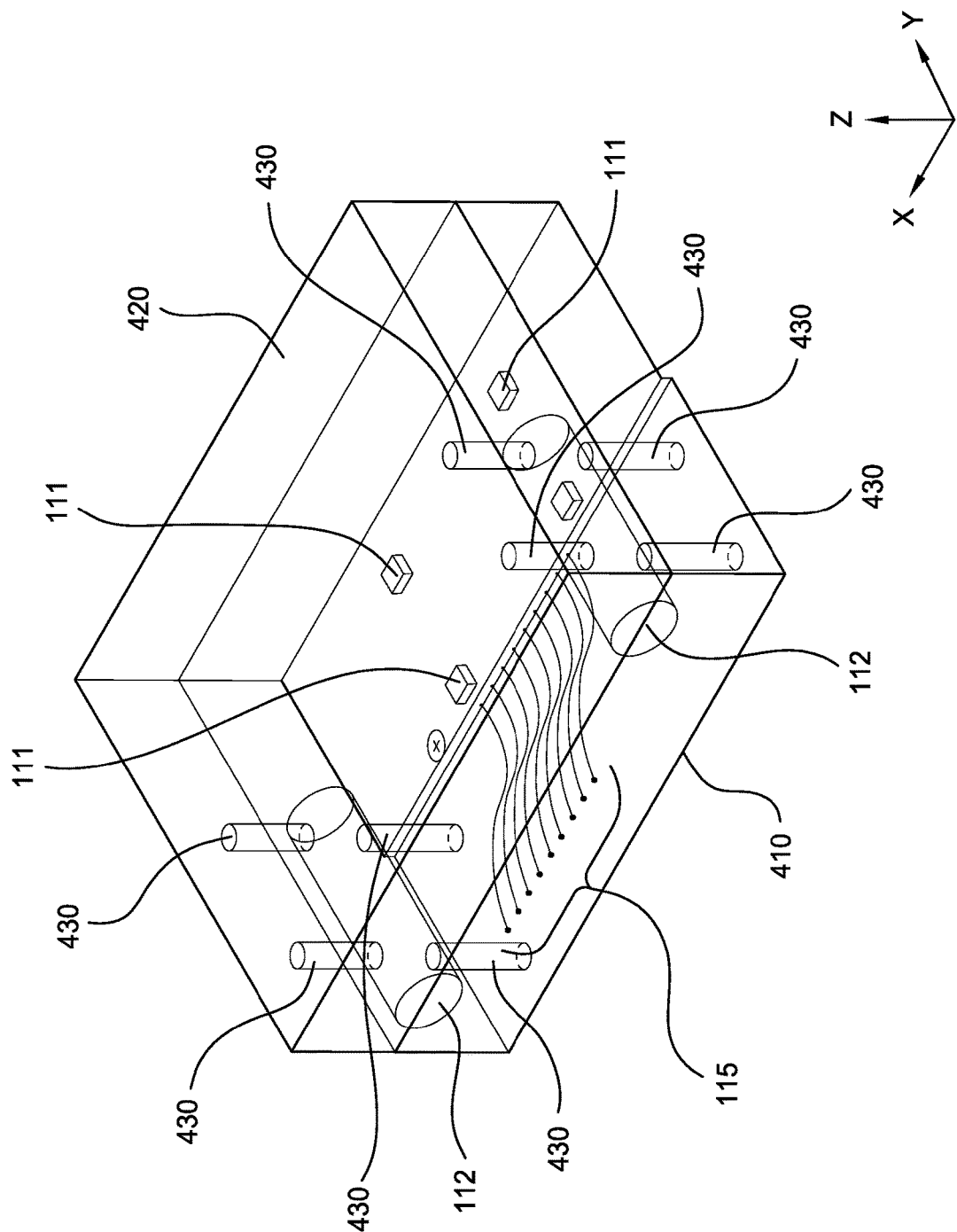

FIG. 4B is an isometric view of a first photonic element 410 and a second photonic element 420 in which the first photonic element 410 and the second photonic element 420 are connected to form an optical adapter 110. Also illustrated in FIG. 4B are several through-holes 430 in the optical adapter 110 running through the cable connectors 112 in the first photonic element 410 and the second photonic element 420. In various embodiments, the through-holes 430 are defined via physical etching or chemical etching of the patterned region 113 to provide a fluid outlet (e.g., the etchant during etching or air when a male connector is inserted into the cable connectors 112). Although illustrated as vertical elements, in other embodiments, the through-holes 430 may be provided in other orientations.

Figure 4C:
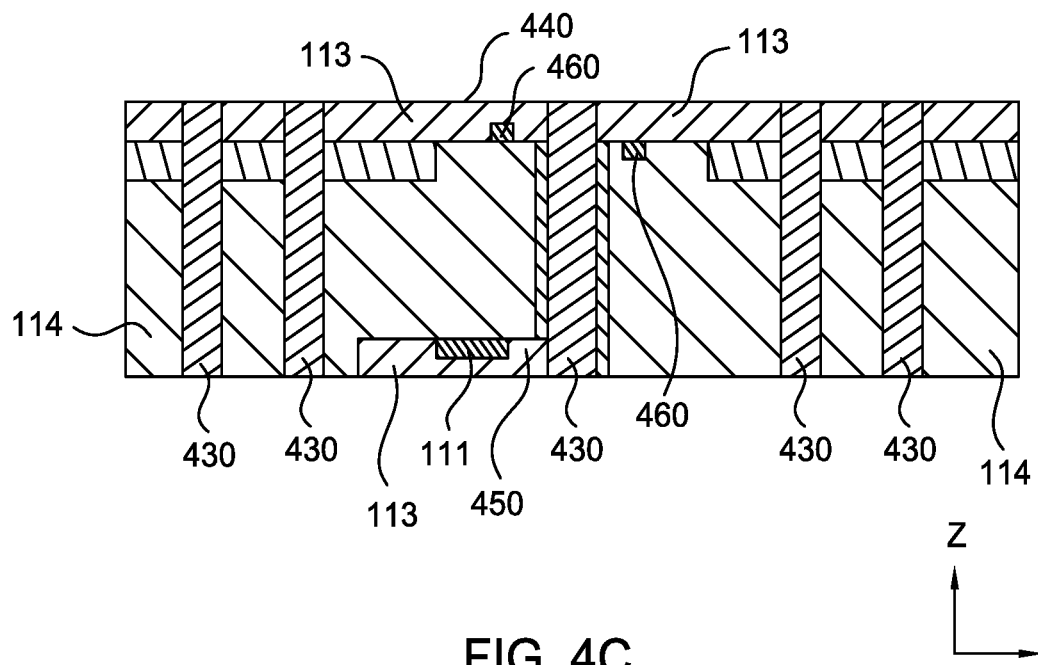
Figure 4D:
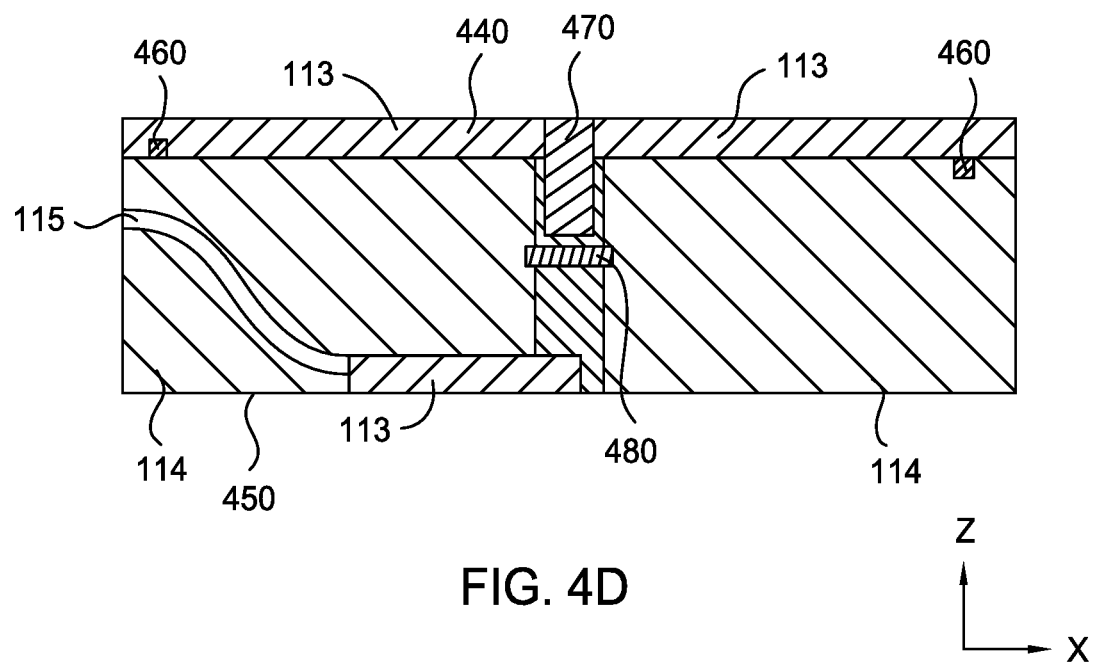

FIG. 4C is a first cross-sectional view of a substrate in which a first photonic element 410 and a second photonic element 420 are defined. The present example shows the first photonic element 410 and the second photonic element 420 defined in a combined die on one substrate for purposes of explanation. In other embodiments, dies for a first photonic element 410 are defined in a separate substrate from the dies for a second photonic element 420. FIG. 4D is a second cross-sectional view of the substrate illustrated in FIG. 4C showing different details of the first photonic element 410 and the second photonic element 420 defined therein.

FIG. 4C illustrates several through-holes 430, including through-holes 430 positioned in the regions corresponding to the portions of patterned region 113 that will be removed to form the cable connectors 112 and a through-hole 430 in a central region of the substrate (between the portions of the un-patterned regions 114 that will form the first photonic element 410 and the second photonic element 420) to channel the etchant from a first surface 440 of the substrate to a second surface 450 of the substrate. For example, a central through-hole 430 may be physical etched to prior to chemical etching to channel the etchant from the first surface 440 on the top side of the substrate to a second surface 450 opposite the first surface 440 to define an engagement feature 111 thereon. FIG. 4C also illustrates a first pair on internal alignment features 460 of matched male and female interconnects that may position and align the first photonic element 410 with the second photonic element 420 when assembled.

FIG. 4D illustrates a second plane of the substrate in which through-holes 430 are absent, but partial channels 470 are present. The partial channels 470 define regions in the substrate that may be physically etched (e.g., to direct the flow of a chemical etchant), but do not run completely from the first surface 440 to the second surface 450 of the substrate. In some embodiments, the partial channels 470 interface with the through-holes 430 to direct an etchant to particular portions of the substrate. For example, the partial channel 470 illustrated in FIG. 4D may flow into the central through-hole 430 illustrated in FIG. 4C to direct an etchant to the patterned region 113 on the second surface 450 of the substrate. In some embodiments, a channel 480 of an un-patterned region 114 may physically link one or more dies on the substrate for the duration of the etching process, and may be removed by a physical processing or dicing process once chemical etching has concluded.

FIG. 4D also illustrates a waveguide 115, and a second pair of internal alignment features 460 of matched male and female interconnects that may position and align the first photonic element 420 with the second photonic element 420 when assembled. Although the illustrated waveguide 115 is configured for direct transmission, waveguides 115 configured for evanescent transmission may also be defined in multi-piece constructions for an optical adapter 110.

FIGS. 5A-E illustrate various views of an example optoelectronic device 100 with an optical adapter 110 configured with open cable connectors 112. As will be appreciated, in a given view, a given feature may be occluded or obscured by another feature, and a better understanding of how the features of an optoelectronic device interact may be gained by considering FIGS. 5A-E in aggregate than individually.

Figure 5A:
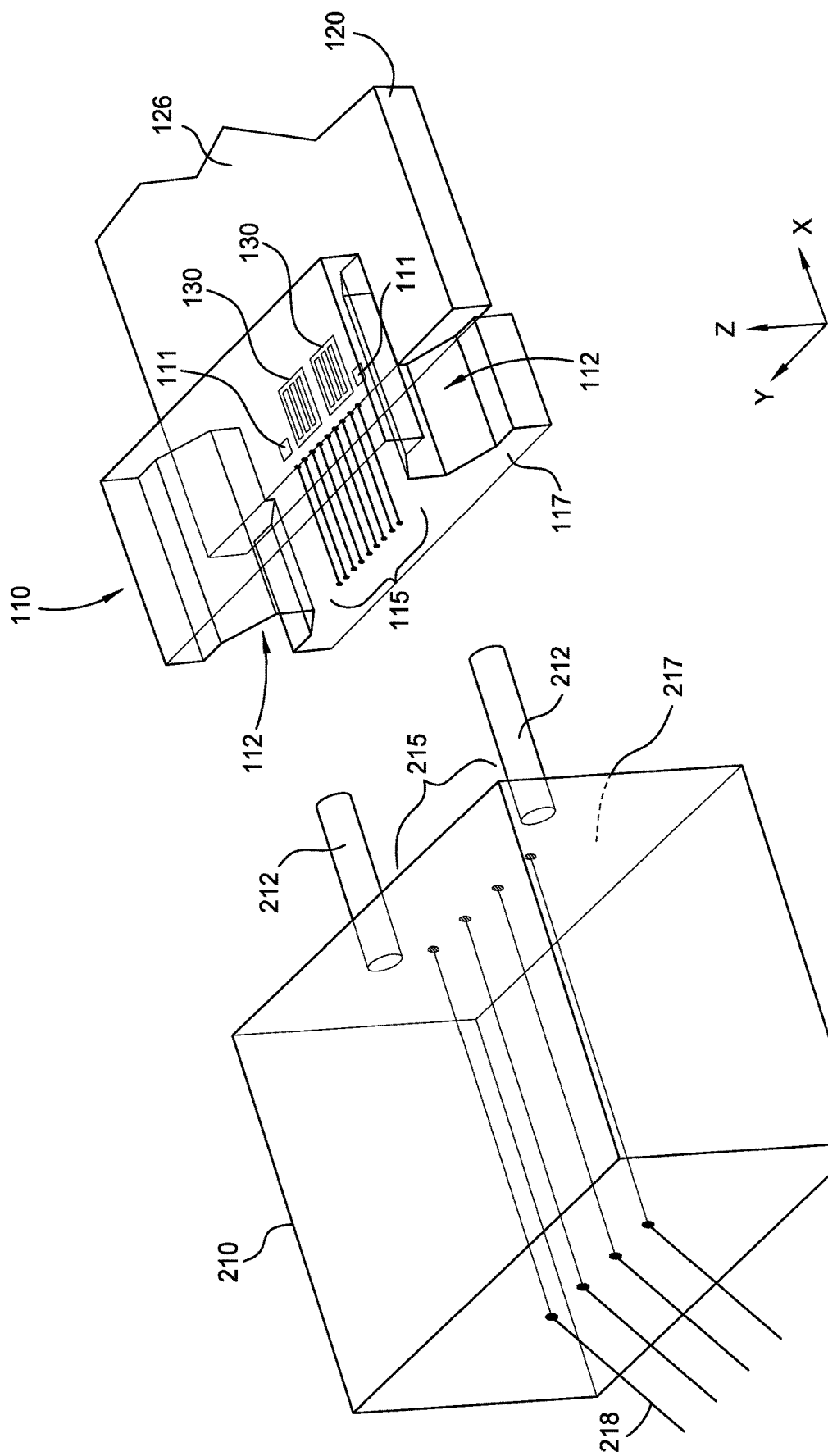
FIGS. 5A-E illustrate various views of an example optoelectronic device with an optical adapter configured with open cable connectors according to aspects of the present disclosure.

FIG. 5A illustrates an isometric view of a translucent optical adapter 110 that is affixed to and optically coupled with the PIC 120. As shown, engagement features 111 of the optical adapter 110 are engaged with mating features 121 of the PIC 120, and epoxy joints 130 are formed between the optical adapter 110 and the PIC 120. Epoxy joints 130 are formed via a deposited epoxy (e.g., in an epoxy well) being cured to bond one component to another. The optical adapter 110 shows cable connectors 112 extending from a free surface 117, and a set of waveguides 115 that run from the free surface 117 of the optical adapter 110 to an optical coupling interface 118 of the optical adapter 110 that is held in contact with integrated waveguides 125 in the PIC 120. A mating interface 116 and an optical coupling interface 118 of the optical adapter 110 may be collectively referred to as a connecting surface, and although illustrated as being disposed on two orthogonal planes in FIGS. 5A-E, may be disposed on a curved surface or more than two planes in other embodiments.

An external fiber optic plug 210 is illustrated in relation to the optoelectronic device 100, which may be coupled with the optoelectronic device 100 via the optical adapter 110. As illustrated, the external fiber optic plug 210 includes securing features 212 that secure the external fiber optic plug 210 to the optical adapter 110, and fiber waveguides 215 that extend from a plug surface 217 to fiber cables 218. In the illustrated example, the securing features 212 are male prongs that the cable connectors 112 are configured to receive to secure the plug surface 217 of the external fiber optic plug 210 against the free surface 117 of the optical adapter 110. In other embodiments, in which the securing features 212 are female connectors, the cable connectors 112 are male connectors configured for insertion into the securing features 212 to secure the plug surface 217 against the free surface 117. When secured against the free surface 117, a fiber waveguide 215 is optically coupled with a waveguide 115 in the optical adapter 110. In various embodiments, some or all of the fiber waveguides 215 may optically couple with some or all of the waveguides 115. For example, an external fiber optic plug 200 may include N fiber waveguides 215 and the optical adapter 110 may include N waveguides 115 to allow each fiber waveguide 215 to optically couple with one waveguide 115. In another example, an external fiber optic plug 200 may include N fiber waveguides 215 and the optical adapter 110 may include N+M waveguides 115 (e.g., to work with multiple standards of external fiber optic plug 200), and M of the waveguides 115 may remain uncoupled when N of the waveguides 115 are optically coupled with the N fiber waveguides 215.

In contrast to the closed cable connectors 112 illustrated in FIGS. 2A and 3A, the cable connectors 112 illustrated in FIG. 5A are open. Open cable connectors 112 are exposed on the free surface 117 (to allow insertion of the securing features 212), and are also exposed on a surface orthogonal to the free surface 117. During the manufacturing process, a patterned region 113 is defined in the substrate of the optical adapter 110 such that the patterned region 113 runs from the etching surface 119 to the free surface 117 and a surface orthogonal to the free surface 117. The portion of the patterned region 113 that runs to the orthogonal surface defines a channel opening by which a chemical etchant applied to the substrate may carry away material removed from the substrate, and allowing the chemical etchant to etch from the etching surface 119 to the free surface 117. Although the orthogonal surface in which the channel opening is defined is shown on the "side" of the example optical adapter 110 in FIGS. 5A-E, in other embodiments the "top" or the "bottom" side may include the channel opening. Similarly, the size of the channel opening may vary in different embodiments from the examples illustrated in FIGS. 5A-E.

Figure 5B:
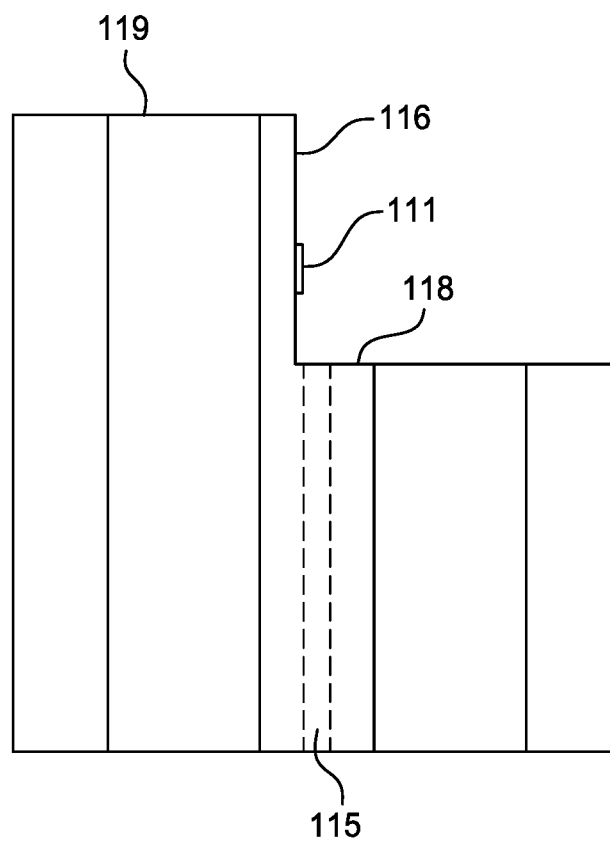
Figure 5C:
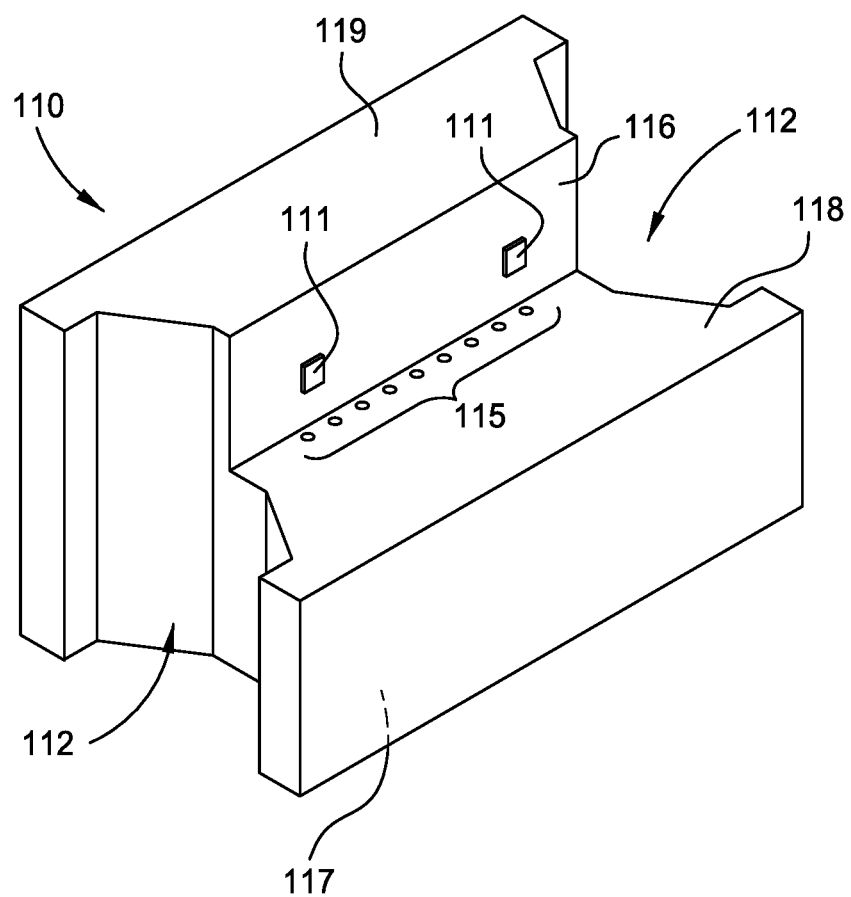

FIG. 5B illustrates a cross-sectional side view of an optical adapter 110 with open cable connectors 112, and FIG. 5C illustrates an isometric view of an optical adapter with open cable connectors 112 as may be positioned during chemical etching. The open cable connectors 112 are defined by a pattern imparted by a laser in the substrate from which the optical adapter 110 is formed. The pattern alters the chemical bonds of the substrate material to increase the material's reactivity to a chemical etchant. In the illustrated embodiment, the pattern extends from an etching surface 119 to the free surface 117, and defines a channel opening in a plan orthogonal to the free surface 117, which allow a chemical etchant applied to the etching surface 119 to run off and away from the optical adapter 110 once the chemical etchant has reacted with the substrate in the patterned region; allowing fresh etchant to come into contact with the remaining patterned region and allowing spent etchant to carry material away from the optical adapter 110. The free surface 117 may be mounted below the etching surface 119 during a chemical etch process to allow gravity to assist the flow of etchant through the patterned region. The patterned region that defines the open cable connectors 112 may be in fluid communication and part of the patterned region that defines the mounting surfaces or may be separate from the other patterned regions defined in the substrate of the optical adapter 110. For example, un-patterned regions may separate the patterned regions that define the waveguides 115 from the patterned regions that define the open cable connectors 112.

Figure 5D:
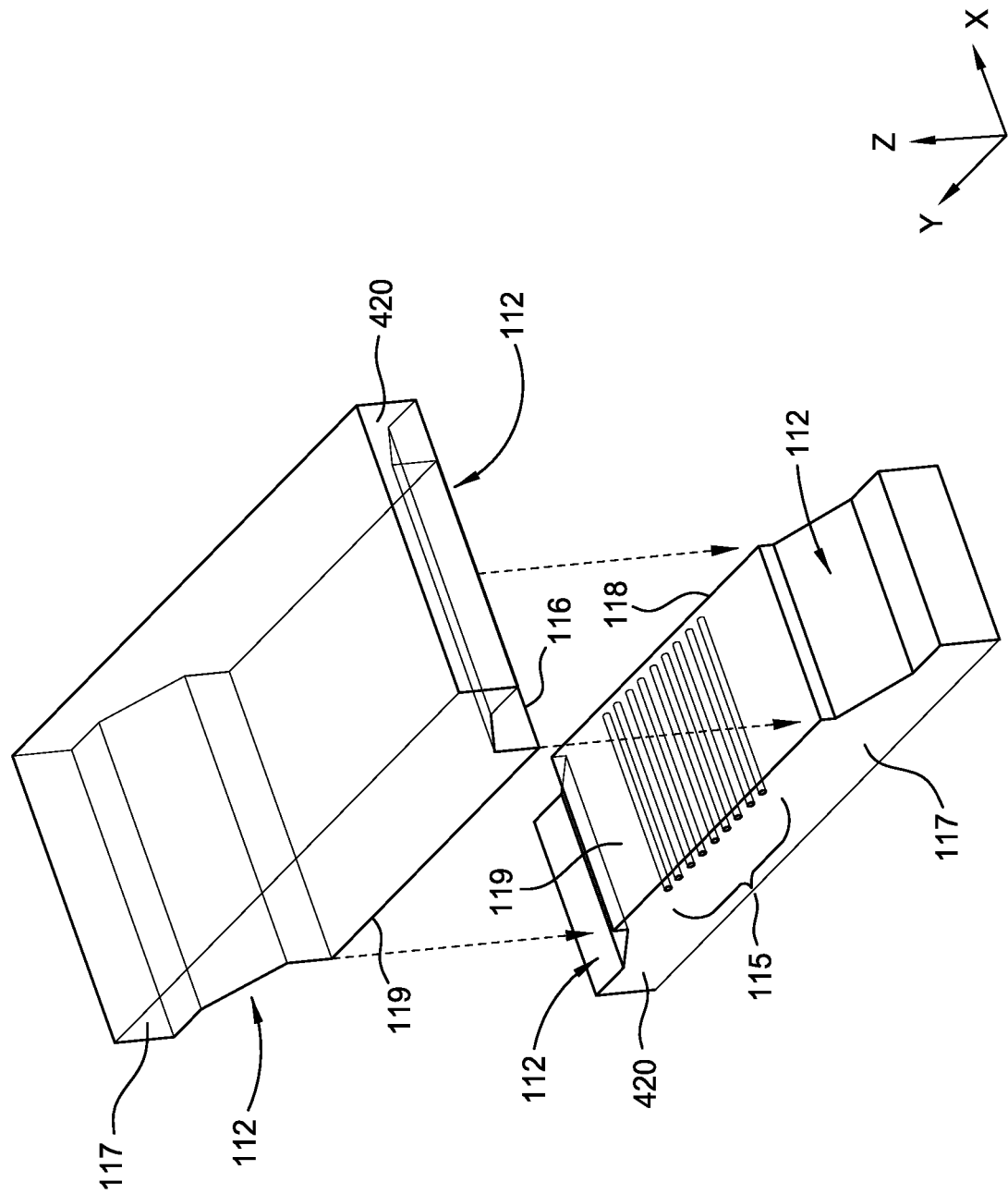

FIG. 5D is an isometric view of a first photonic element 410 and a second photonic element 420 that are configured to connect together to form an optical adapter 110. The illustrated first photonic element 410 includes a first portion of the cable connectors 112 and the waveguides 115. The illustrated second photonic element 420 includes a second portion of the cable connectors 112, so that when the first photonic element 410 is connected with the second photonic element 420, the first and second portions define the open cable connectors 112. The relative amounts of patterning applied to the first photonic element 410 and the second photonic element 420 may be varied to account for a greater or lesser portion of the cable connectors 112 to be defined by one of the first photonic element 410 or the second photonic element 420. In some embodiments, the open cable connector 112 is defined solely by etching on one of first photonic element 410 or second photonic element 420, with the other of flat first photonic element 410 or second photonic element 420 providing a flat un-etched surface to define a surface of the open cable connector 112.

In some embodiments, the second photonic element 420 may be constructed to be longer than the first photonic element 410 (along the Y axis) to define the mating interface 116 (and may include engagement features 111 and epoxy joints 130 defined thereon). Additionally, various alignment features and male/feature interconnects may be defined on the mating surfaces of the first photonic element 410 and the second photonic element 420 to ensure that the free surfaces 117 of the respective photonic elements are aligned into a single surface when the first photonic element 410 and the second photonic element 420 are joined together.

In various embodiments, dies for a first photonic element 410 may be defined on the same or a separate substrate from the dies for a second photonic element 420. In some embodiments, the etching surfaces 119 for each of the first photonic element 410 and the second photonic element 420 may be the surfaces by which the two elements are mated together. In other embodiments, the free surface 117 (or the opposite surface) for each of the first photonic element 410 may be the etching surface for the respective photonic element.

Figure 5E:
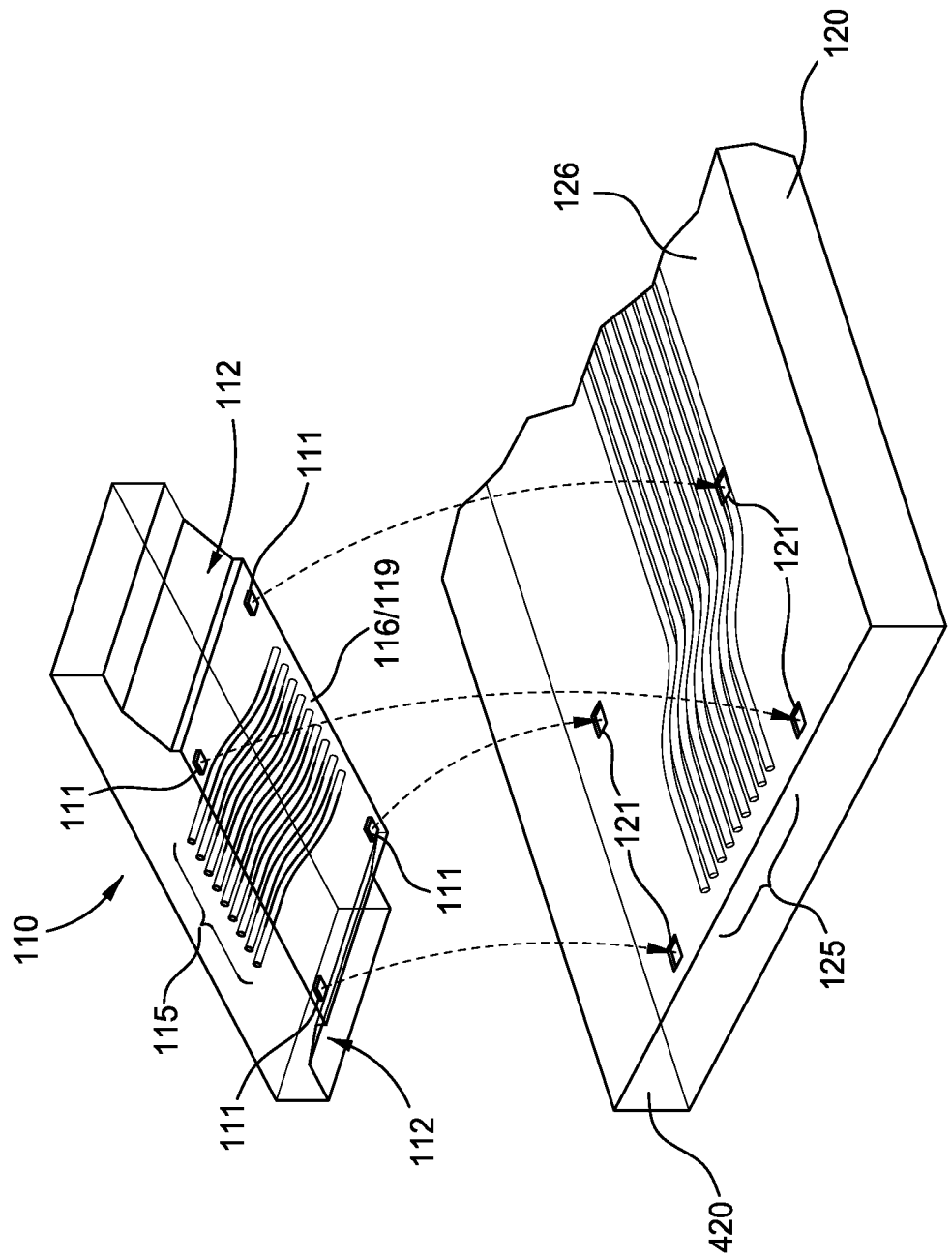

FIG. 5E is an isometric view of an optical adapter 110 that is configured to mount with the PIC 12 to form cable connectors 112. The illustrated optical adapter 110 includes a first portion of the cable connectors 112 and the waveguides 115, and uses the mating surface 126 of the PIC 120 to form additional surfaces/portions of the cable connectors 112. The mating interface 116 of the optical adapter 110 may include various engagement features 111 (not illustrated) to interface with the mating features 121 (not illustrated) of the PIC 120 to align the waveguides 115 with the integrated waveguides 125 for evanescent coupling. In various embodiments, the optical adapter 110 of FIG. 5E may be constructed such that the etching surface 119 and the mating interface 116 are the same surface or parallel surfaces (e.g., the etching surface 119 may be removed to reveal the mating interface 116).

FIGS. 6A-G illustrate various coupling arrangements of waveguides 115 within an optical adapter 110. The individual paths of waveguides 115 within an optical adapter 110 may vary in different embodiments in the number of waveguides 115, the arrangement of waveguides 115, the three-dimensional path that each waveguide 115 runs in the optical adapter 110, etc., and the example coupling arrangements shown in FIGS. 6A-G are illustrative of but a few arrangements. It will be appreciated that the coupling arrangements may be applied in embodiments that use evanescent or direct transmission of light. A given embodiment of an optical adapter 110 may use one or more of the example coupling arrangements in combination with one another.

Figure 6A:
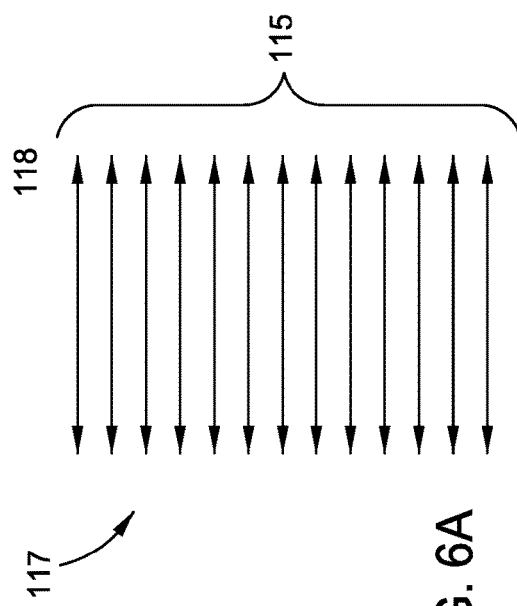
FIGS. 6A-G illustrate various planar arrangements of waveguides within an optical adapter according to aspects of the present disclosure.
Figure 6B:
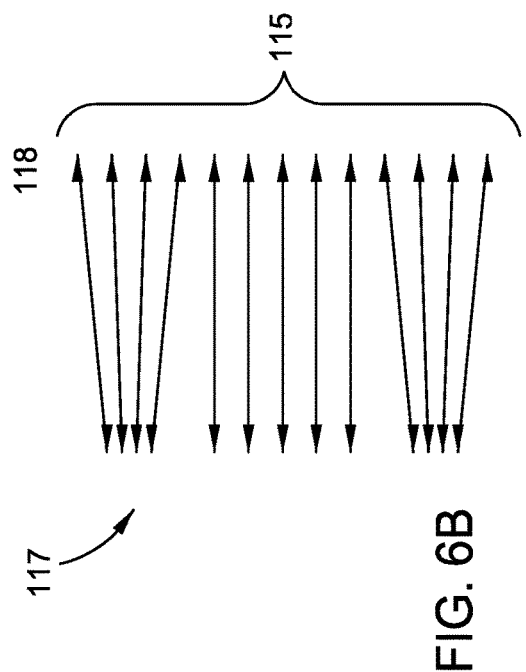
Figure 6C:
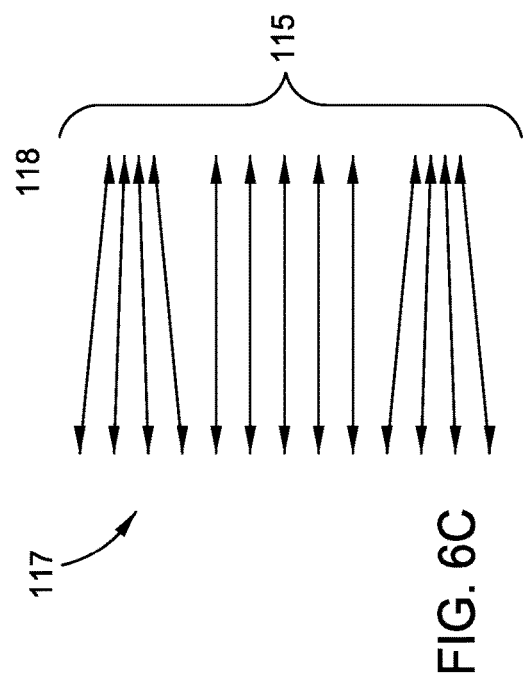
Figure 6D:
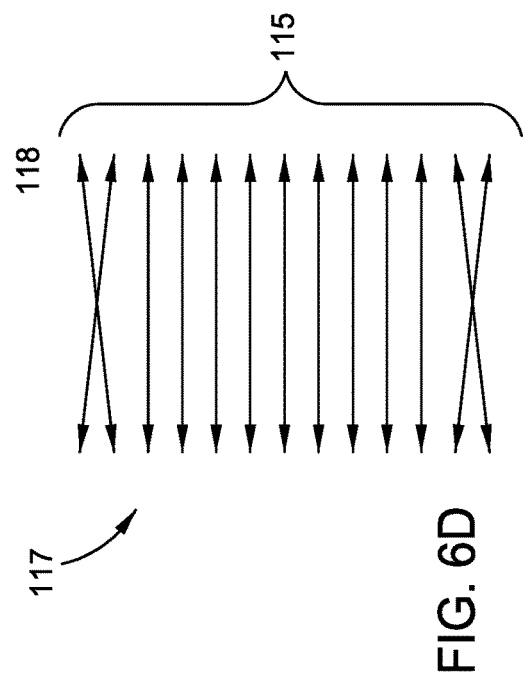

FIG. 6A illustrates several waveguides 115 arranged for straight coupling, in which the number, spacing, and order of the waveguides 115 remain consistent from the free surface 117 to the optical coupling interface 118. FIG. 6B illustrates several waveguides 115 arranged for condensed coupling, in which the number and order of the waveguides 115 remain consistent, but the spacing decreases from the free surface 117 to the optical coupling interface 118. FIG. 6C illustrates several waveguides 115 arranged for expanded coupling, in which the number and order of the waveguides 115 remain consistent, but the spacing increases from the free surface 117 to the optical coupling interface 118. FIG. 6D illustrates several waveguides 115 arranged with swapped ordering, in which the number of waveguides 115 remain consistent, the relative order of the waveguides 115 at the free surface 117 is different than at the optical coupling interface 118. The spacing and order of the various waveguides 115 may be adjusted to account for various standards used on the connector side and the PIC side of an assembly, to allow a PIC 120 to use a different standard than the external fiber optic plug 210.

Figure 6F:
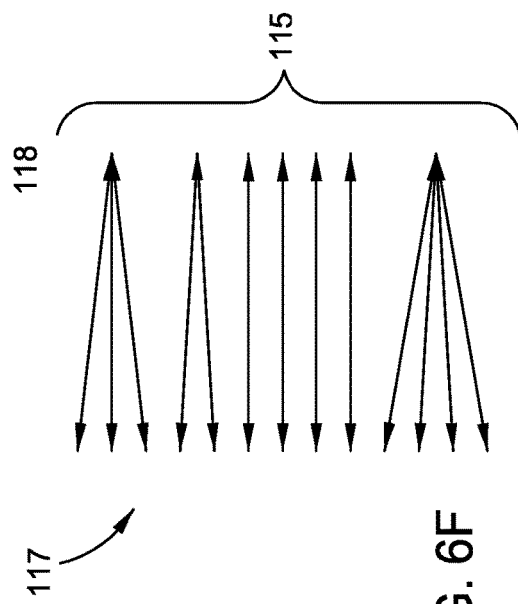
Figure 6E:
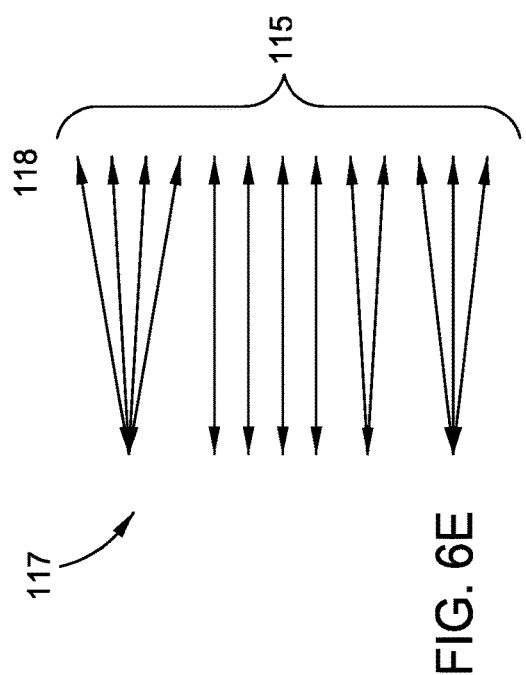

FIG. 6E illustrates several waveguides 115 arranged for combined coupling, in which several waveguides 115 defined at the free surface 117 combine into one waveguide 115 at the optical coupling interface. FIG. 6F illustrates several waveguides 115 arranged for split coupling, in which one waveguides 115 defined at the free surface 117 splits into multiple waveguides 115 at the optical coupling interface. Waveguides 115 may split/combine signals for various purposes in signal processing, such as for amplifying, extinguishing, or accepting multiple signals for a single output.

Figure 6G:
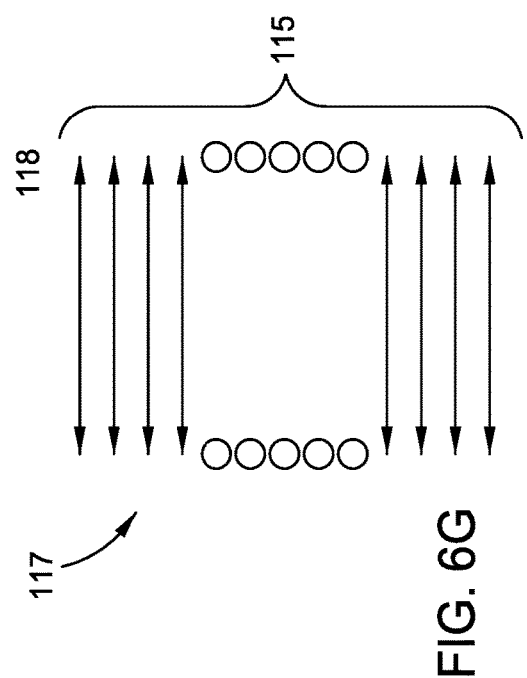

FIG. 6G illustrates several waveguides 115 arranged with several unused pathways. In some embodiments, the unused pathways have no waveguide 115 defined between the free surface 117 and the optical coupling interface 118. In other embodiments, waveguides 115 are defined between the free surface 117 and the optical coupling interface 118, but a corresponding integrated waveguide 125 or fiber waveguide 215 is not present or couple with the waveguide 115 on the unused path.

Figure 7:
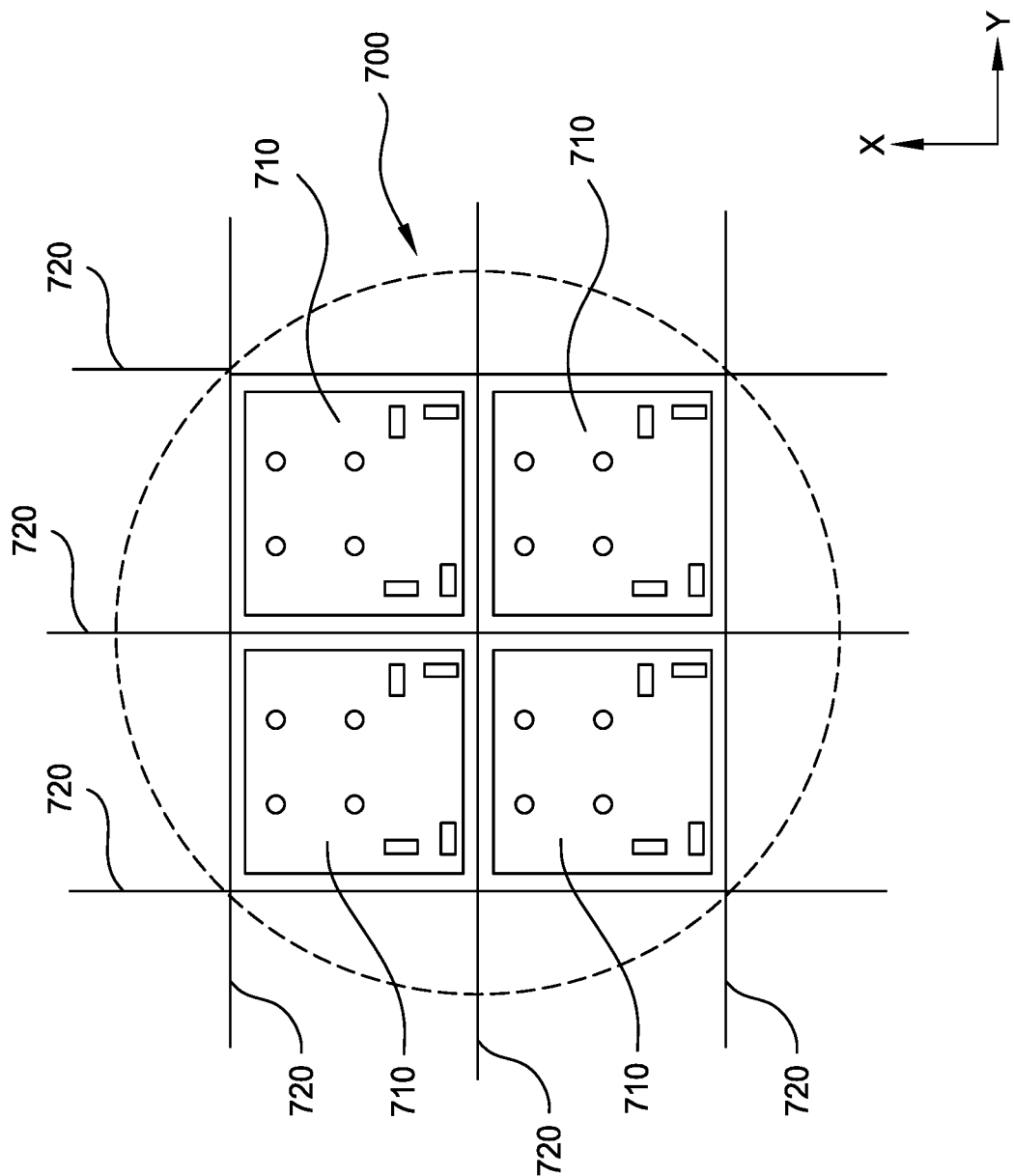
FIG. 7 illustrates an example substrate layout according to aspects of the present disclosure.

FIG. 7 illustrates an example substrate layout 700. The example layout 700 shows four dies 710 for various photonic elements, although more or fewer dies 710 may be present on other substrates with different layouts 700. Each of the dies 710 is shown with a first surface on which several features have been produced via etching. These features may include features that protrude from the first surface of the die 710 as well as features that extend into the die 710 from the first surface based on the patterned region 113 applied to the material of the substrate. Several dice-lines 720 are illustrated between the dies 710 that indicate where a physical etching operation may be performed to separate the dies 710 from the substrate and one another.

FIGS. 8A-D illustrate detailed views of engaging engagement features 111 and mating features 121 of the PIC 120. Each of the detailed views is illustrated relative to a thickness (T) of the features and a width (W) of the features, which may correspond to various planes in the optoelectronic device 100 depending on the orientation of the engagement feature 111 and the mating feature 121.

Figure 8A:
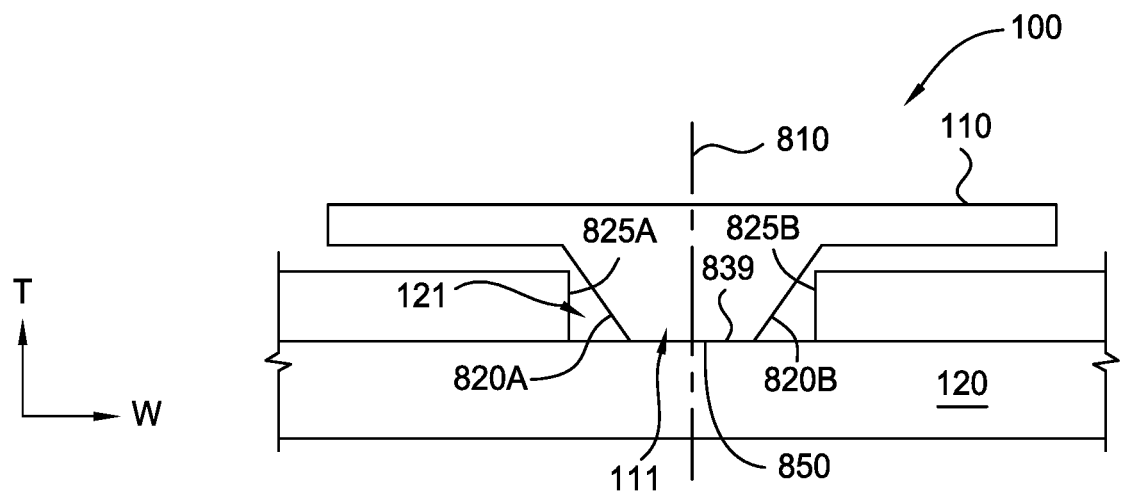
FIGS. 8A-D illustrate detailed views of engaging engagement features and mating features of the optoelectronic assembly according to aspects of the present disclosure.

FIG. 8A illustrates engaging an engagement feature 111 with a mating feature 121, according to one embodiment disclosed herein. Specifically, FIG. 8A illustrates a cross section of a male engagement feature 111 and a female mating feature 121, but other embodiments may switch which of the engagement feature 111 and the mating feature 121 is male/female. In one embodiment, these features may form a frustum and a rectangular trench, respectively.

FIG. 8A illustrates a desired target location 810 where a middle of the engagement feature 111 aligns with a middle of the mating feature 121. That is, for optimal alignment, the middle of the engagement feature 111 contacts the middle of a bottom surface 830 of the mating feature 121. In this example, the mating feature 121 includes a trench or cutout in an Inter-Layer Dielectric (ILD) on the top of the PIC 120. The ILD may be formed on a substrate of the PIC 120, which may be a semiconductor substrate such as crystalline silicon.

In this example, a bottom surface 850 of the engagement feature 111 contacts the bottom surface 830 of the mating feature 121. Moreover, as discussed in more detail below, the engagement feature 111 includes self-correcting alignment features 820 (e.g., the slanted sides of the engagement feature 111) which contact sides 825 of the mating feature 121 for correcting the alignment of the optical adapter 110 and the PIC 120 when the middles of the engagement feature 111 and the mating feature 121 are not aligned.

Figure 8B:
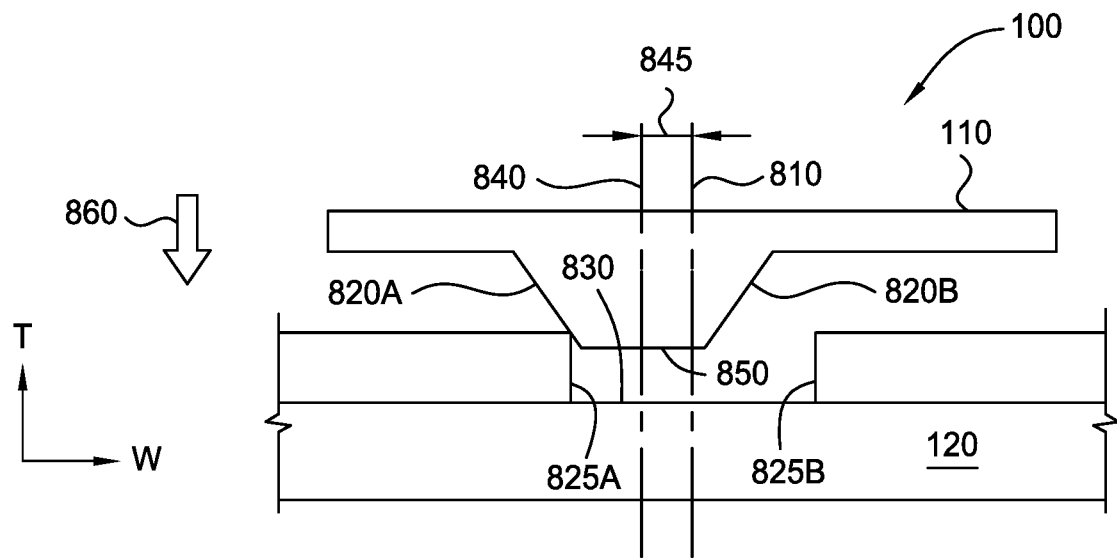
Figure 8C:
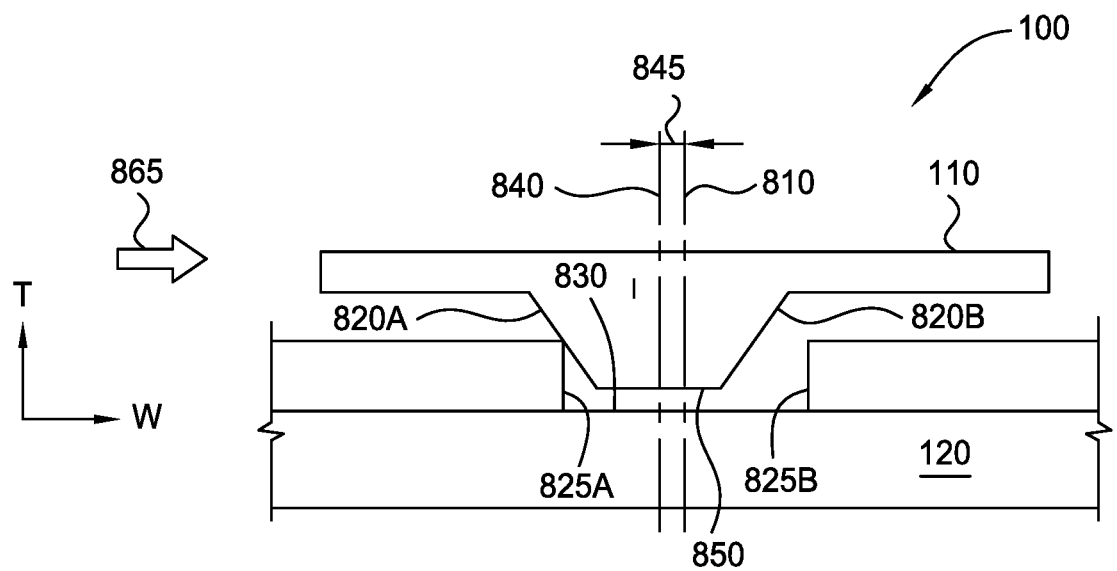
Figure 8D:
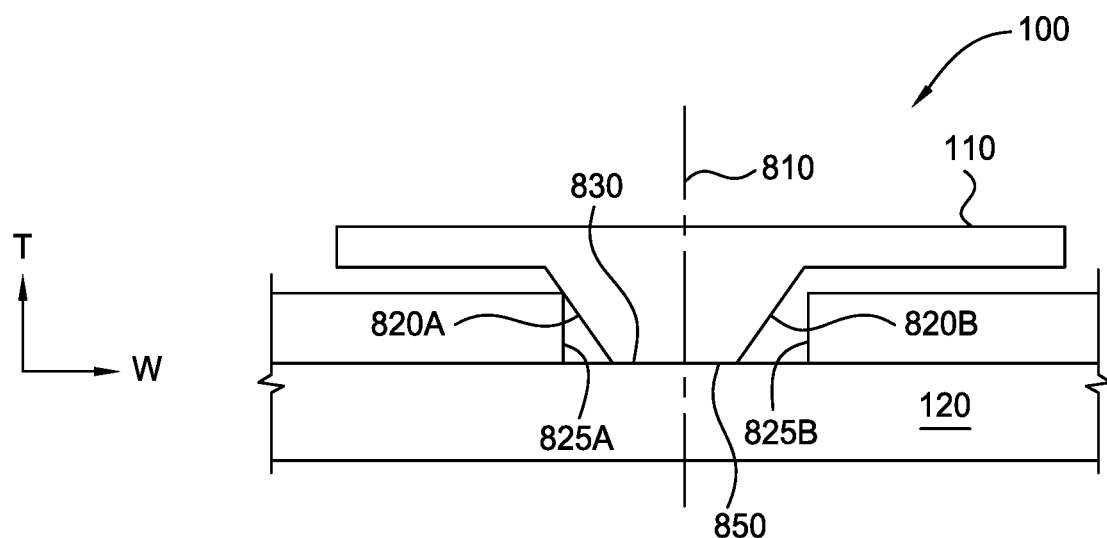

FIGS. 8B-D illustrate mating a misaligned engagement feature 111 with a mating feature 121, according to embodiments disclosed herein. FIG. 8B illustrates a scenario where the middle of the engagement feature 111 is offset 840 from the desired target location 810. The difference between the offset 840 and the target location 810 is illustrated as a misalignment 845. Stated differently, the misalignment 845 is the distance between respective middles of the engagement feature 111 and the mating feature 121.

The misalignment 845 can occur because of tolerances corresponding to the bonding machine or apparatus (e.g., a die bonder) used to place the optical adapter 110 on the PIC 120. For example, the die bonder may guarantee that the middle of the engagement feature 111 is within ±10 micrometers from the middle of the mating feature 121 (e.g., the desired target location 810). FIG. 8B illustrates a worst case scenario where the misalignment 845 is the maximum tolerance of the bonding machine.

To compensate for the tolerance or accuracy of the bonding machine, the engagement feature 111 is designed such that regardless of the misalignment 845, the self-correcting alignment feature 820 contacts a side 825 of the mating feature 121. That is, the width (W) of the engagement feature 111 can be controlled such that the flat, bottom surface 850 of the engagement feature 111 falls within the mating feature 121, and as a result, at least one of the self-correcting alignment features 820 contacts one of the sides 825.

The accuracy of the alignment in FIG. 8B, where the bottom surface 850 of the engagement feature 111 contacts the bottom surface 830 of the mating feature 121, may depend on the amount of control of the flatness of the bottom surface 850 on the engagement feature 111 and the tolerance on the etch depth of the mating feature 121 (which can be around +/−0.5 micrometers for many dielectrics). Moreover, the slope of the self-correcting alignment features 820 can be tightly controlled using an orientation dependent etch, such as a KOH etch, a denser application of the patterned region 113, and the like.

In FIG. 8B, when the die bonder moves the optical adapter 110 in the vertical direction illustrated by the arrow 860, the bottom surface 850 is between the sides 825A and 825B. Thus, even at maximum misalignment 845, the bottom surface 830 is within the mating feature 121.

As the optical adapter 110 continues to move in the direction shown by the arrow 860, the self-correcting alignment feature 820A contacts the side 825A which is illustrated in FIG. 8C. The die bonder continues to apply downward pressure, but the resulting contact between the alignment feature 820A and the side 825A creates a horizontal motion as shown by the arrow 865, which moves the middle of the engagement feature 111 closer to the middle of the mating feature 121. That is, in one embodiment, the die bonder does not apply the horizontal motion directly (e.g., the die bonder may apply pressure in the vertical direction) for the optical adapter 110 to move horizontally relative to the PIC 120 to correct for the misalignment 845. The vertical pressure applied by the die bonder is converted into the horizontal motion illustrated by the arrow 865 to align the piece parts.

FIG. 8C illustrates when the die bonder has moved the parts until the bottom surface 850 of the engagement feature 111 contacts the bottom surface 830 of the mating feature 121. The middles of the engagement feature 111 and the mating feature 121 may both be aligned at the target location 810, although there may be some remaining misalignment due to the tolerances of the fabrication steps used to form the engagement feature 111 and the mating feature 121. However, the tolerances for processing the engagement feature 111 and the mating feature 121 may be much smaller or tighter than the tolerances for the die bonder—e.g., within +/−500 nanometers. For example, the engagement feature 111 may be defined via a laser imparting a patterned region 113 in the material of the optical adapter 110. Similarly, the techniques for defining and etching the mating feature 121 can have much tighter tolerances than the die bonder.

Each of the engagement feature 111 and the mating feature 121 are aligned relative to the waveguides 115, 125 to ensure optical coupling therebetween without the use of active testing. For example, the engagement feature 111 is defined relative to the waveguide 115 and the mating feature 121 is defined relative to the integrated waveguide 125 with a high enough degree of precision (e.g., with a tolerance within +/−500 nanometers) to ensure that when the optical adapter 110 is affixed to the PIC 120, that the waveguide 115 is optically aligned with the integrated waveguide 125. The laser may define the engagement feature 111 and the waveguide 115 simultaneously (or at separate times, using a shared alignment point) to ensure the high degree of precision. Similarly, a laser may define the mating feature 121 and the integrated waveguide 125 simultaneously (or at separate times, using a shared alignment point). The alignment features 820 ensure that the precision in fabrication of the engagement feature 111 is maintained during assembly of the optical adapter 110 with the PIC 120.

Figure 9A:
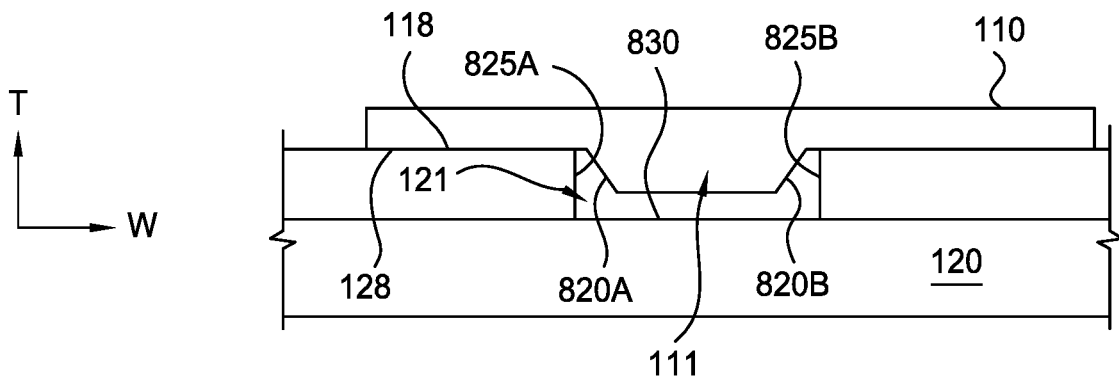
FIG. 9A illustrates mating the engagement feature with the mating feature according to aspects of the present disclosure.

FIG. 9A illustrates mating the engagement feature 111 with the mating feature 121. Unlike in FIG. 8D, where the bottom surface 850 of the engagement feature 111 contacts the bottom surface 830 of the mating feature 121, in this example, there remains a gap between the bottom surface 850 of the engagement feature 111 and the bottom surface 830 of the mating feature 121. Instead, the thickness of the engagement feature 111 is controlled such that a mating interface 116 of the optical adapter 110 at a base of the frustum formed by the engagement feature 111 contacts a mating surface 126 of the PIC 120.

In one embodiment, given the tolerances associated with the fabrication steps forming the engagement feature 111 and the mating feature 121, at least one of the self-correcting alignment features 820 may contact one of the sides 825 when aligned, while at least one other of the self-correcting alignment features 820 does not. However, in other embodiments, multiple alignment features 820 may contact respective sides 825 when aligned.

Figure 9B:
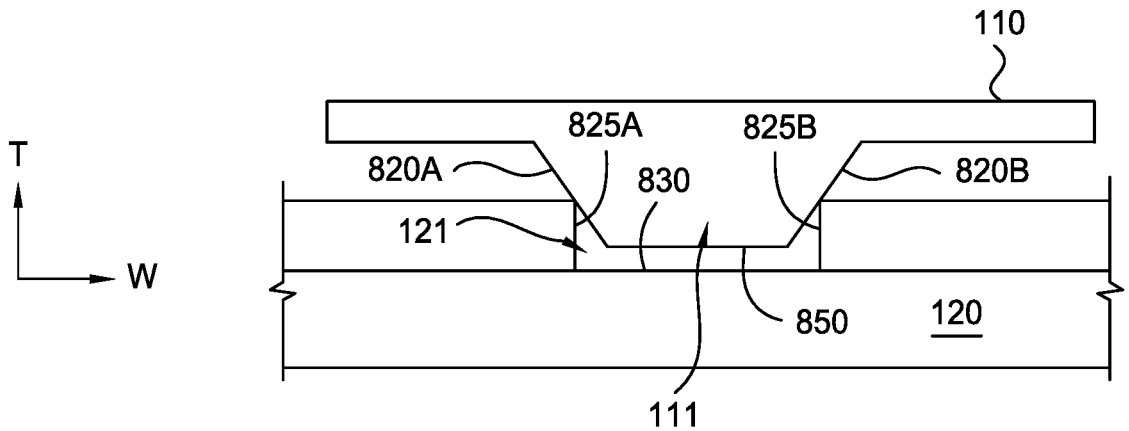
FIG. 9B illustrates engaging the engagement feature with the mating feature according to aspects of the present disclosure.

FIG. 9B illustrates engaging the engagement feature 111 with the mating feature 121. In this example, the width of the engagement feature 111 is again controlled such that the bottom surface 850 fits inside the sides 825 regardless of any misalignment. However, instead of alignment being achieved when a mating interface 116 of the optical adapter 110 contacts a mating surface 126 of the PIC 120, here the optical adapter 110 is aligned when the self-correcting alignment feature 820 on one side of the engagement feature 111 and the self-correcting alignment feature 820 on the opposite side of the engagement feature 111 both contact respective sides 825 of the mating feature 121. Although FIG. 9B illustrates the self-correcting alignment feature 820A contacting the side 825A and the self-correcting alignment feature 820B contacting the side 825B, more or fewer self-correcting alignment features 820 (e.g., a circular mating feature 121 may have one continuous edge forming multiple "sides" 825 when viewed in cross-section) in the engagement feature 111 may contact respective sides 825 of the mating feature 121. Contacting two oppositely disposed self-correcting alignment features 820 to two sides 825 of the receiver provide alignment in a given plane. Moreover, when a third self-correcting alignment feature 820 (which is disposed between the two oppositely disposed alignment features) contacts a side 825 of the mating feature 121, this can provide alignment in a further direction or plane.

Figure 9C:
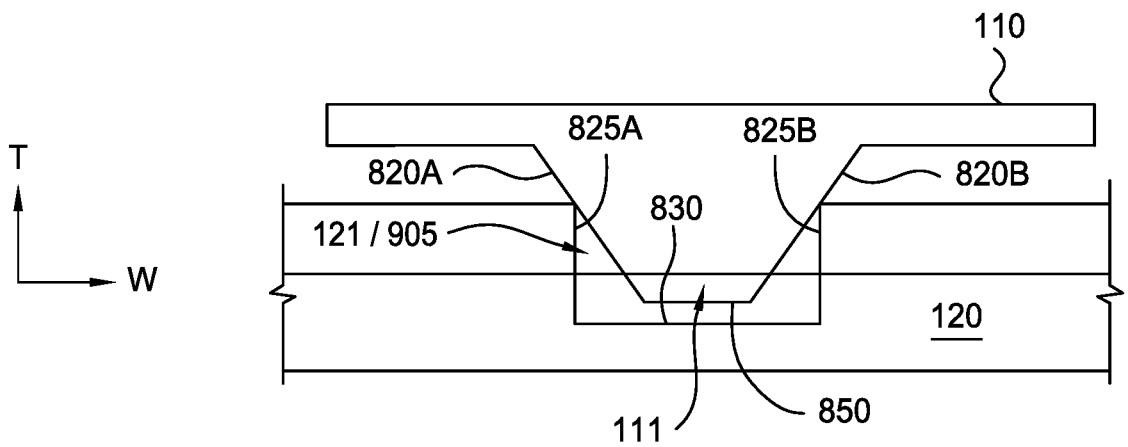
FIG. 9C illustrates engagement the engagement feature with the mating feature according to aspects of the present disclosure.

FIG. 9C illustrates engaging the engagement feature 111 with the mating feature 121. FIG. 9C relies on a similar alignment principle in FIG. 9B where at least two opposing self-correcting alignment features 820 contact respective sides 925 of a trench—e.g., a deep alignment receiver 905. However, instead of forming the engagement feature 111 solely within an ILD, in FIG. 9C, the deep alignment receiver 905 extends into the substrate of the PIC 120. In one embodiment, the deep alignment receiver 905 may have a depth greater than 15 micrometers. Further, the depth of the deep alignment receiver 905 may permit the engagement feature 111 to have a pyramidal shape rather than a frustum shape as shown in FIG. 9C. That is, the self-correcting alignment features 820 may intersect at a point rather than forming a flat bottom surface 850 facing the bottom surface 830 of the deep alignment receiver 905.

One advantage of using the alignment technique illustrated in FIGS. 9B and 9C is that the spacing between the mating interface 116 of the optical adapter 110 and the mating surface 126 of the PIC 120 can be filled with epoxy for bonding the two components together (e.g., providing an epoxy well produced by physically processing or chemically etching the substrates). However, relying on contact between the self-correcting alignment features 820 and the sides can cause stress which may increase the likelihood of chipping the sides 825.

Figure 10:
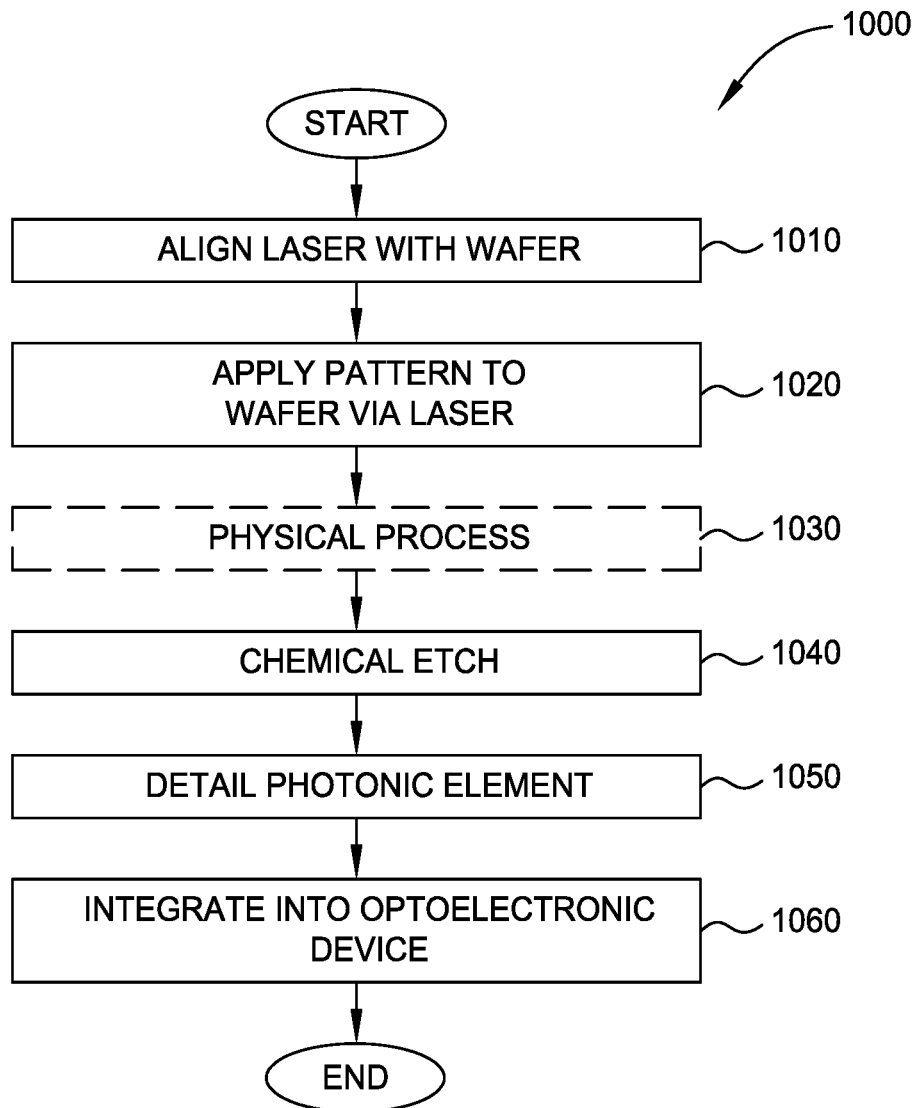
FIG. 10 is a flowchart illustrating high level operations of an example method for the use of laser patterning in optical components according to aspects of the present disclosure.

FIG. 10 is a flowchart illustrating high level operations of an example method 1000 for the use of laser patterning in optical components. Method 1000 begins at block 1010, where a laser is aligned with a substrate. In various embodiments, a given feature (such as an etched or plated "+" mark, circle or fiducial) in a die 710 of the substrate or the substrate itself is selected as an alignment point. The laser may be aligned in one plane (e.g., a two-dimensional alignment) or in three dimensions relative to the substrate.

At block 1020, the laser applies a pattern to the material of the substrate. The laser applies the pattern relative to the alignment point to define an etching pattern to the substrate. The etching pattern designates portions of the substrate as patterned regions 113, and the portions to which the etching pattern is not applied as un-patterned regions 114. By applying the etching pattern, the laser alters a chemical bond in the material of the substrate for the patterned region 113 that increases a reactivity of the material in the patterned region 113 to an etchant relative to a reactivity of the material in the un-patterned regions 114. The patterned region 113 thus may define the engagement feature 111, cable connectors 112, etc., in the un-patterned region 114 that will remain after chemical etching, which are configured to engage with a mating feature 121 on an optoelectronic device 100 or an external cable.

In addition to applying the etching pattern at block 1020, the laser may also apply waveguide patterns to the substrate at block 1020. The waveguide pattern defines one or more pathways (i.e., waveguides 115) through the material of the die 710 with different refractive indices that the surrounding material to direct the propagation of light through the material. The waveguides 115 may have first ends that are co-aligned with the engagement features 111, to ensure optical coupling with the integrated waveguides 125 of the PIC 120 when mounted. Similarly, the waveguides 115 may have second ends that that are co-aligned with the cable connectors 112, to ensure optical coupling with an external cable.

In some embodiments, the laser defines where the waveguide pattern is located simultaneously with where the etching pattern is applied relative to the alignment point and imparts the patterns simultaneously. In other embodiments, the etching pattern is applied relative to the alignment point, and the waveguide pattern is later applied relative to the etching pattern (e.g., after a chemical etch). In further embodiments, the waveguide pattern is applied relative to the alignment point, and the etching pattern is later applied relative to the waveguide pattern.

At block 1030, optional physical processing may occur. A drill, laser ablator, saw, water jet, or the like may physically etch or processes through-holes 430 or channels 480 in a first surface of the die 710 to direct the flow of a chemical etchant, to remove excess material before a chemical etchant is applied, or to apply features to the die 710 that require less precision than the engagement features 111, cable connectors 112, and waveguides 115. In some embodiments, block 1030 may be performed after block 1040 to separate various dies 710 from one another in a substrate layout 700, to impart labels, or the like.

At block 1040, a chemical etchant is applied to the die 710. The etchant reacts with the material of the die 710, thereby removing material from the physically exposed surfaces of the die 710 and physically exposing the underlying material. The patterned regions 113 (i.e., those portions of the die 710 to which the laser applied the etching pattern) react more vigorously with the etchant, in some cases up to 5000 times more vigorously, and thus lose material faster than the un-patterned regions 114. The patterned regions 113 thus define what material is left behind in the un-patterned regions 114 once chemical etching concludes, including the engagement features 111, cable connectors 112, and various surfaces of the photonic element defined in the die 710.

At block 1050, after chemical etching (per block 1040), the photonic element (waveguides, lenses, and other optical features) is detailed. In various embodiments, detailing the photonic element may include dicing the photonic element from the substrate, polishing at least one surface of the photonic element, or affixing the photonic element to a second photonic element (e.g., in a multi-piece design).

At block 1060, the photonic element is integrated into the optoelectronic device 100. A die bonder may align the engagement features 111 with the mating features 121 of the PIC 120 and connect the engagement features 111 with the mating features 121. In various embodiments, the engagement features 111 (or the mating features 121) are designed with various self-correcting alignment features 820 that improve the precision at which the die bonder may integrate the engagement features 111 with the mating features 121. The precision at which the engagement features 111 with the mating features 121 are connected influences where the waveguides 115 and the integrated waveguides 125 are positioned relative to one another. By fabricating the engagement features 111 of an optical adapter 110 with the precision afforded by laser patterning, (e.g., with tolerances with ±500 nanometers) a die bonder may affix the optical adapter 110 with similar precision, and thus passively align the waveguides 115 of the optical adapter 110 with the integrated waveguides 125 of the PIC 120 (i.e., without requiring active alignment and test). As part of affixing the photonic element to optoelectronic device 100, the die bonder may apply and cure an epoxy to form epoxy joints 130 that secure the separate components together. In other embodiments, the thermocompression or wafer bonding processes may be used in addition to or instead of die or epoxy bonding.

After the photonic element is integrated into the optoelectronic device 100, various tests of the optical coupling, dimensioning, loss ratios, extinction ratios, and the like may be performed, and method 1000 may then conclude.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

In view of the foregoing, the scope of the present disclosure is determined by the claims that follow.

We claim:
1. A substrate, comprising:
 a light-transmissive material having a first side and a second side opposite to the first side;
 a plurality of dies defined in the light-transmissive material, each die of the plurality of dies including:
  a first pattern imparted on the light-transmissive material by a laser, wherein:
   the first pattern extends into the light-transmissive material from the first side, the first pattern defining a patterned region of the light-transmissive material and an un-patterned region of the light-transmissive material,
   the patterned region has a chemical structure that was changed by the laser, wherein the chemical structure has an increased reactivity to an etchant relative to the un-patterned region, and
   the patterned region defines an engagement feature in the un-patterned region that is configured to engage with a mating feature on a Photonic Integrated Circuit (PIC) after the patterned region has been removed using the etchant; and
  a second pattern imparted on the light-transmissive material by the laser, wherein:
   the second pattern extends to neither the first side nor the second side, the second pattern defining a waveguide within the light-transmissive material,
   a change in the chemical structure of the second pattern is caused by the laser, and
   the waveguide is aligned relative to the engagement feature to optically couple with an integrated waveguide of the PIC.

2. The substrate of claim 1, wherein the engagement feature is defined as a first gender connector and the mating feature is defined as a second gender connector, wherein the first gender is one of male and female and the second gender is different from the first gender.

3. The substrate of claim 1, further comprising:
a third pattern imparted on the light-transmissive material by the laser, wherein the third pattern extends into the light-transmissive material from the first side, the third pattern defining a second patterned region of the light-transmissive material and a second un-patterned region of the light-transmissive material, wherein a chemical structure of the second patterned region has an increased reactivity to the etchant relative to the second un-patterned region, and wherein the second patterned region defines a cable connector with the patterned region.

4. The substrate of claim 1, further comprising:
a physical processing region defining a cable connector to be exposed from the substrate via mechanical processing that removes the physical processing region.

5. The substrate of claim 1, further comprising a second plurality of dies, wherein each die of the plurality of dies defines a first photonic element and each die of the second plurality of dies further defines a second photonic element configured to mate with the first photonic element to define a multi-piece optical adapter, wherein the second photonic element is assembled with the first photonic element into the multi-piece optical adapter to define additional connectors for the multi-piece optical adapter not defined solely by the first photonic element.

6. The substrate of claim 1, wherein the waveguide runs from the second side to a third side orthogonal to the second side to enable evanescent coupling with the integrated waveguide of the PIC.

7. The substrate of claim 1, wherein the first pattern defines a mating interface in a plane parallel to the second side and the waveguide runs from the second side to the mating interface.

8. A substrate, comprising:
a light-transmissive material having a first side and a second side opposite to the first side;
a plurality of dies defined in the light-transmissive material, each die of the plurality of dies including:
a first pattern imparted on the light-transmissive material by a laser, wherein the first pattern extends into the light-transmissive material from the first side, the first pattern defining a patterned region of the light-transmissive material and an un-patterned region of the light-transmissive material, wherein a chemical structure of the patterned region has an increased reactivity to an etchant relative to the un-patterned region, and wherein the patterned region defines an engagement feature in the un-patterned region that is configured to engage with a mating feature on a Photonic Integrated Circuit (PIC);
a second pattern imparted on the light-transmissive material by the laser, wherein the second pattern extends to neither the first side nor the second side, the second pattern defining a waveguide within the light-transmissive material resulting from a laser induced change in the chemical structure of the second pattern, wherein the waveguide is aligned relative to the engagement feature to optically couple with an integrated waveguide of the PIC; and
a third pattern imparted on the light-transmissive material by the laser, wherein the third pattern extends into the light-transmissive material from the first side, the third pattern defining a second patterned region of the light-transmissive material and a second un-patterned region of the light-transmissive material, wherein a chemical structure of the second patterned region has an increased reactivity to the etchant relative to the second un-patterned region, and wherein the second patterned region defines a cable connector with the patterned region.

9. The substrate of claim 8, wherein the engagement feature is defined as a first gender connector and the mating feature is defined as a second gender connector, wherein the first gender is one of male and female and the second gender is different from the first gender.

10. The substrate of claim 8, further comprising:
a physical processing region defining a cable connector to be exposed from the substrate via mechanical processing that removes the physical processing region.

11. The substrate of claim 8, further comprising a second plurality of dies, wherein each die of the plurality of dies defines a first photonic element and each die of the second plurality of dies further defines a second photonic element configured to mate with the first photonic element to define a multi-piece optical adapter, wherein the second photonic element is assembled with the first photonic element into the multi-piece optical adapter to define additional connectors for the multi-piece optical adapter not defined solely by the first photonic element.

12. The substrate of claim 8, wherein the waveguide runs from the second side to a third side orthogonal to the second side to enable evanescent coupling with the integrated waveguide of the PIC.

13. The substrate of claim 8, wherein the first pattern defines a mating interface in a plane parallel to the second side and the waveguide runs from the second side to the mating interface.

14. A substrate, comprising:
a light-transmissive material having a first side and a second side opposite to the first side including:
a first pattern imparted on the light-transmissive material by a laser, wherein:
the first pattern extends into the light-transmissive material from the first side, the first pattern defining a patterned region of the light-transmissive material and an un-patterned region of the light-transmissive material,
the patterned region has a chemical structure that was changed by the laser, wherein the chemical structure has an increased reactivity to an etchant relative to the un-patterned region, and
the patterned region defines an engagement feature in the un-patterned region that is configured to engage with a mating feature on a Photonic Integrated Circuit (PIC) after the patterned region has been removed using the etchant; and
a second pattern imparted on the light-transmissive material by the laser, wherein:
the second pattern extends to neither the first side nor the second side, the second pattern defining a waveguide within the light-transmissive material,
a change in the chemical structure of the second pattern is caused by the laser, and
the waveguide is aligned relative to the engagement feature to optically couple with an integrated waveguide of the PIC.

15. The substrate of claim 14, wherein the engagement feature is defined as a first gender connector and the mating feature is defined as a second gender connector, wherein the first gender is one of male and female and the second gender is different from the first gender.

16. The substrate of claim 14, further comprising:
a third pattern imparted on the light-transmissive material by the laser, wherein the third pattern extends into the light-transmissive material from the first side, the third pattern defining a second patterned region of the light-transmissive material and a second un-patterned region of the light-transmissive material, wherein a chemical structure of the second patterned region has an increased reactivity to the etchant relative to the second un-patterned region, and wherein the second patterned region defines a cable connector with the patterned region.

17. The substrate of claim 14, further comprising:
a physical processing region defining a cable connector to be exposed from the substrate via mechanical processing that removes the physical processing region.

18. The substrate of claim 14, further comprising a plurality of dies defining a plurality of first photonic elements, wherein the light-transmissive material defines a plurality of second photonic elements, wherein one of the plurality of first photonic elements is configured to mate with one of the plurality of second photonic elements to define a multi-piece optical adapter, wherein the second photonic element is assembled with the first photonic element into the multi-piece optical adapter to define additional connectors for the multi-piece optical adapter not defined solely by the plurality of second photonic elements.

19. The substrate of claim 14, wherein the waveguide runs from the second side to a third side orthogonal to the second side to enable evanescent coupling with the integrated waveguide of the PIC.

20. The substrate of claim 14, wherein the first pattern defines a mating interface in a plane parallel to the second side and the waveguide runs from the second side to the mating interface.

* * * * *